United States Patent
Moses et al.

[19]

[11] Patent Number: 5,905,212
[45] Date of Patent: May 18, 1999

[54] LOAD AND DEFLECTION MEASUREMENT SYSTEM FOR ELASTOMERIC BEARINGS

[75] Inventors: Charles J. Moses, Mansfield; Michael E. Hogan, Arlington, both of Tex.

[73] Assignee: Continental Emsco Company, Houston, Tex.

[21] Appl. No.: 08/868,824

[22] Filed: Jun. 4, 1997

[51] Int. Cl.$^6$ .................................................. G01L 1/04
[52] U.S. Cl. ............................ 73/862.451; 73/862.043
[58] Field of Search ...................... 73/862.041, 862.043, 73/862.044, 862.451, 862.46

[56] References Cited

U.S. PATENT DOCUMENTS

| | | | |
|---|---|---|---|
| 3,695,096 | 10/1972 | Kutsay ................................ | 73/88.5 R |
| 3,746,372 | 7/1973 | Hynes et al. ............................ | 285/95 |
| 4,043,545 | 8/1977 | Dial et al. ............................... | 267/116 |
| 4,095,852 | 6/1978 | Schutz ................................... | 308/3 R |
| 4,117,719 | 10/1978 | Schutz ................................... | 73/141 A |
| 4,168,160 | 9/1979 | Stoferle et al. .......................... | 75/140 |
| 4,474,060 | 10/1984 | Crossman ................................ | 73/129 |
| 4,573,362 | 3/1986 | Amlani ............................... | 73/862.044 |
| 4,644,805 | 2/1987 | Haffner ................................ | 73/862.68 |
| 4,753,553 | 6/1988 | Carlsen et al. ........................ | 405/195 |
| 4,763,531 | 8/1988 | Dietrich et al. .................... | 73/862.044 |
| 4,780,026 | 10/1988 | Gunderson ........................... | 405/224 |
| 4,836,029 | 6/1989 | Skala et al. ............................. | 73/799 |
| 4,896,543 | 1/1990 | Gullman .............................. | 73/862.541 |
| 4,900,165 | 2/1990 | Alvelid et al. ........................... | 73/768 |
| 5,060,525 | 10/1991 | Hafner . | |
| 5,133,578 | 7/1992 | Whightsil, Sr. et al. ................ | 85/166 |
| 5,167,385 | 12/1992 | Hafner ............................... | 244/76 R |
| 5,186,043 | 2/1993 | Yamaoka et al. ................... | 73/862.041 |
| 5,269,629 | 12/1993 | Langner ............................ | 405/195.1 |
| 5,291,795 | 3/1994 | Hafner ............................. | 73/862.041 |
| 5,314,024 | 5/1994 | Rodgers et al. ........................ | 166/347 |
| 5,439,060 | 8/1995 | Huete et al. ............................ | 166/367 |

FOREIGN PATENT DOCUMENTS

| | | | |
|---|---|---|---|
| 0 255 084 A2 | 7/1987 | European Pat. Off. .......... | G01L 9/00 |
| 2 035 240 | 6/1980 | United Kingdom ........... | B63B 21/50 |
| 2113799 | 1/1983 | United Kingdom . | |
| 2 299 649 | 9/1996 | United Kingdom .............. | F16F 1/38 |

OTHER PUBLICATIONS

Herbst, P. T., Natural Rubber as a Bearing Material for Rotary Wing Aircraft Applications, (1972) pp. 3–8.

CRC Handbook of Mathematical Tables, 1980, CRC Press Inc., Boca Raton, Florida, pp. 43–44.

Omega Pressure and Strain Measurement Handbook and Encyclopedia, (1984), Omega Engineering, Inc., Stamford, CT., pp. B–3, B–7, B–8, B–18, E–3, E–27, E–28, E–29, E–39 to E–46.

(List continued on next page.)

*Primary Examiner*—Max H. Noori
*Attorney, Agent, or Firm*—Arnold White & Durkee

[57] ABSTRACT

Force transducers are integrated in an elastomeric flex bearing to provide signals for determining the tension and torque upon a tension member coupled to the bearing and for computation of the azimuth and elevation of the tension member. Preferably the force transducers are mounted to or embedded in an outer metal load ring of the flex bearing and are bonded with the outer metal load ring to the elastomer of the flex bearing. The force transducer, for example, include a diaphragm bonded to the elastomer, and the diaphragm has a diameter in excess of the spacing between the outer metal load ring and the nearest laminated metal reinforcement of the bearing. In one embodiment, metal foil strain gages are bonded to the surface of the diaphragm opposite from the elastomer. In another embodiment, the diaphragm transmits pressure to hydraulic fluid between the diaphragm and the outer metal support ring. A proximity sensor sensing the position of the diaphragm with respect to the outer metal support ring can be used to detect any loss of hydraulic fluid and to calibrate the hydraulic transducer under an unknown load by injecting hydraulic fluid under pressure until the diaphragm assumes a position for which the fluid pressure is indicative of the pressure applied by the elastomer to the diaphragm.

47 Claims, 18 Drawing Sheets

OTHER PUBLICATIONS

FlexJoints for TPL Mooring Systems, Drilling and Production Risers, Oil States Industries, (1984) A Division of Continental Emsco Co., Arlington, TX.

CS5516, CS5520, 16–Bit/20–Bit Bridge Transducer A/D Converters, (1994) Crystal Semiconductor Corporation, Austin, TX.

Laminated Teeter Bearing Contributes to the Advance of Wind Turbine Technology.

The Elastomeric Bearing: What It Can Do For You, an ASME Publication, The American Society of Mechanical Engineers, United Engineering Center, New York, N.Y. 10017, pp. 1–8.

The Sikorsky Spirit: A New Breed of Helicopter, pp. 7–9.

LOAD AND DEFLECTION MEASUREMENT SYSTEM FOR ELASTOMERIC BEARINGS

BACKGROUND OF THE INVENTION

1. Field of the Invention

The present invention relates generally to elastomeric bearings, and more particularly to tether bearings for risers and tendons for offshore platforms.

2. Background Art

For offshore drilling operations, it is conventional to moor a floating marine platform by tendons depending from the platform to anchors on the seabed. In such a tendon leg platform (TLP), the tendons hold the platform at a level below its normal buoyancy level in order to reduce vertical buoyant movement of the platform. Therefore, the tendons are put under tensile stress by the buoyancy of the platform. Elastomeric bearings are often used for connecting the tendons to the floating platform in order to reduce tension variation caused by the vertical buoyant movement of the platform and to accommodate some pivoting and axial rotation of the tendons with respect to the floating platform.

A final tension adjustment of the tendons of a TLP is usually made after deballasting of the TLP hull. As a result of deballasting, the gross tendon load is applied via vessel buoyancy. A final adjustment to equalize the load in all tendons is made by mechanical means incorporated into a top connector of each tendon. The final adjustment is accomplished by ballasting the TLP to remove load from the tendons, adjusting the lengths of the tendons, and then deballasting again.

In order to precisely measure the load in all of the tendons, load cells can be interposed between the top connector of each tendon and the TLP. Transducers such as strain gages measure the force applied to the load cells. However, the use of such load cells create structural problems since their inclusion in the load path requires massive support rings to prevent distortions. These support structures can also create stress risers in the conduit string.

Tensioned drilling risers, production risers, and export risers may also be suspended from floating platforms. For such a riser it is desirable to measure the tension applied to the riser during an initial adjustment and to monitor the tension during use in order to ensure that the tension remains within desired design limits.

SUMMARY OF THE INVENTION

In accordance with one aspect of the invention, an elastomeric bearing has force transducer components mounted to a metal support ring, and the force transducer components and the metal support ring are bonded to elastomer of the elastomeric bearing. This construction eliminates the need for load cells and their associated supporting structure and provides protection for signal transmission paths from the transducers to the external environment.

In a preferred construction, the force transducer components mounted to the metal support ring are metal diaphragms. For example, strain gages are bonded to the metal diaphragms on the sides of the metal diaphragms opposite from the elastomer.

In accordance with another aspect of the invention, substantially incompressible fluid is used to convey a pressure signal from a diaphragm bonded to the metal support ring. In a preferred embodiment, a transducer is associated with the diaphragm for in situ adjustment or calibration in which the diaphragm is placed in a position by flow of the fluid so that the fluid pressure indicates the pressure upon the elastomeric bearing.

In accordance with still another aspect of the invention, a plurality of sensors are integrated in an elastomeric flex bearing and disposed at different angular positions around a longitudinal axis of the flex bearing in order to provide force signals from which direction of an elongated tension member coupled to the bearing can be computed relative to the longitudinal axis of the elastomeric flex bearing.

According to a further aspect of the invention, there is provided a method of measuring direction of an elongated tension member relative to a longitudinal axis of a flex bearing to which the elongated tension member is coupled. The method includes sensing respective forces in the elastomeric bearing at a plurality of angular positions around the longitudinal axis of the elastomeric bearing, and from the respective forces computing the direction of the elongated tension member.

BRIEF DESCRIPTION OF THE DRAWINGS

Other objects and advantages of the invention will become apparent upon reading the following detailed description with reference to the accompanying drawings wherein.

Figure 1:
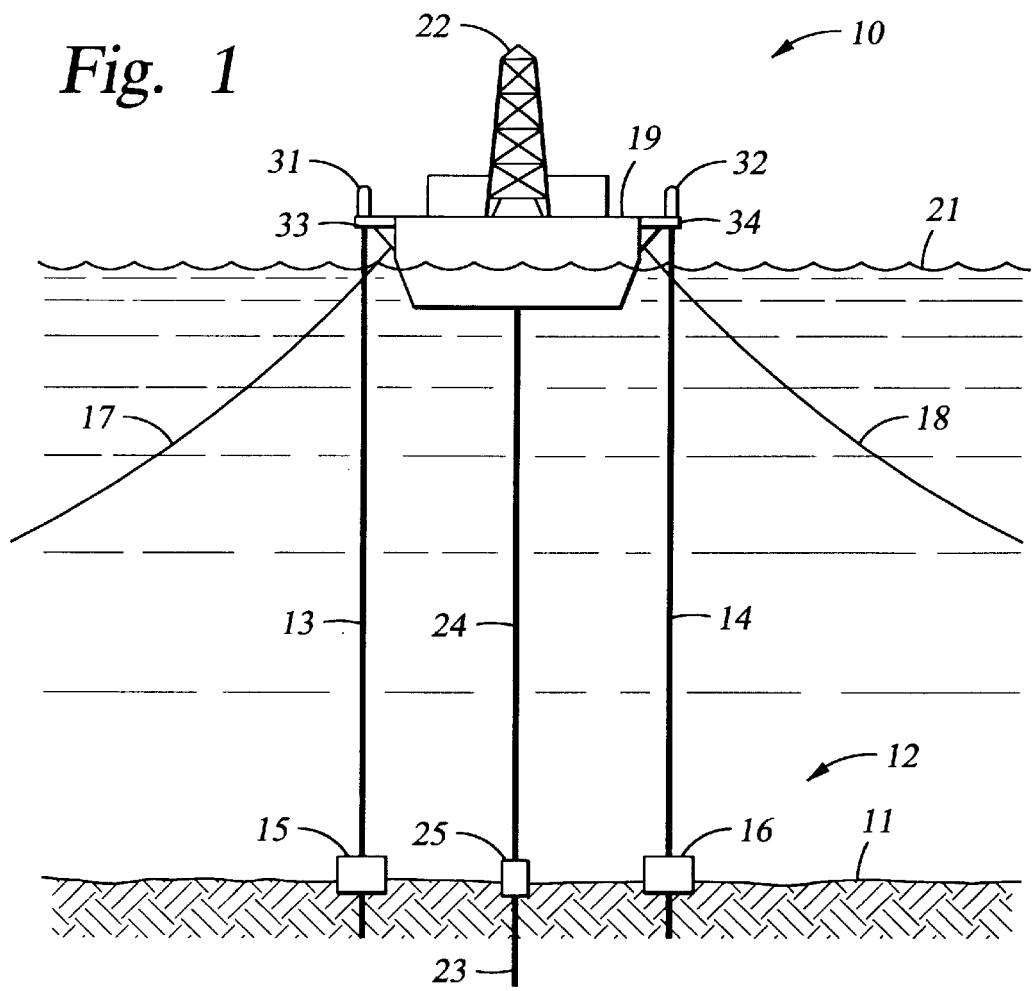
FIG. 1 is a schematic diagram showing various components associated with a floating marine platform.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

Turning now to FIG. 1 of the drawings, there is shown a floating marine platform 10 used for offshore drilling. The floating marine platform 10 is anchored to a foundation generally designated 12 on the seabed 11. In order to reduce vertical buoyant movement of the platform 10, generally vertical tendons 13, 14 depend from the platform to anchors 15, 16 in the foundation 12 on the seabed 11. Laterally extending mooring lines 17, 18 depend from the platform 10 to anchors (not shown) on the seabed 11 in order to constrain horizontal movement of the platform 10 as would be caused by currents and wind.

For drilling, a drill string depends from a derrick 22 on the floating platform 10 to a well bore 23 in the seabed 11. A portion of the drill string 24 called a "riser" depends from the derrick 22 to a wellhead 25 on the seabed 11.

Although only two tendons 13, 14 are shown in FIG. 1, it should be appreciated that for large platforms more than a dozen tendons may be used. For example, a platform known as "Heidrun" is presently being deployed in 345 meters of water in the North Sea. This platform uses a system of 16 tendons for anchoring to the seabed. Each tendon is designed for a maximum tensile load of about 48 million newtons.

The present invention relates more particularly to a load measurement system integrated with an elastomeric flex bearing in a top connector for a tendon. The tendons 13, 14 have respective top connectors 31, 32. The top connectors 13, 14 are seated in respective mooring porch subassemblies 33, 34 welded to the hull 19 of the floating platform 14.

Figure 2:
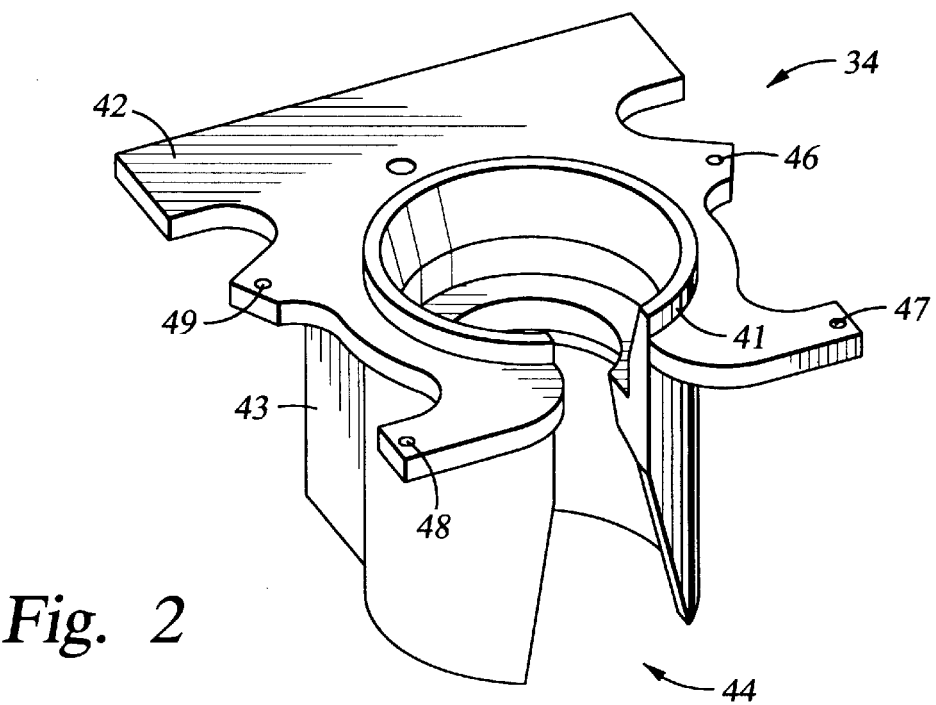
FIG. 2 shows a mooring porch subassembly for mounting a top end portion of a tendon to the floating marine platform shown in FIG. 1.

Referring to FIG. 2, the mooring porch 34 is a weldment consisting of a forged, machined load ring 41 and a number of plates 42, 43. The plates 42, 43, performing as webs and flanges, serve to stabilize the load ring 41 as well as bridge loads between the hull (not shown) and the tendon (not shown). The upper plate 42 includes a number of holes 46, 47, 48, 49 for termination of electrical cables (not shown) from the tendon top connector for cathodic protection.

Figure 4:
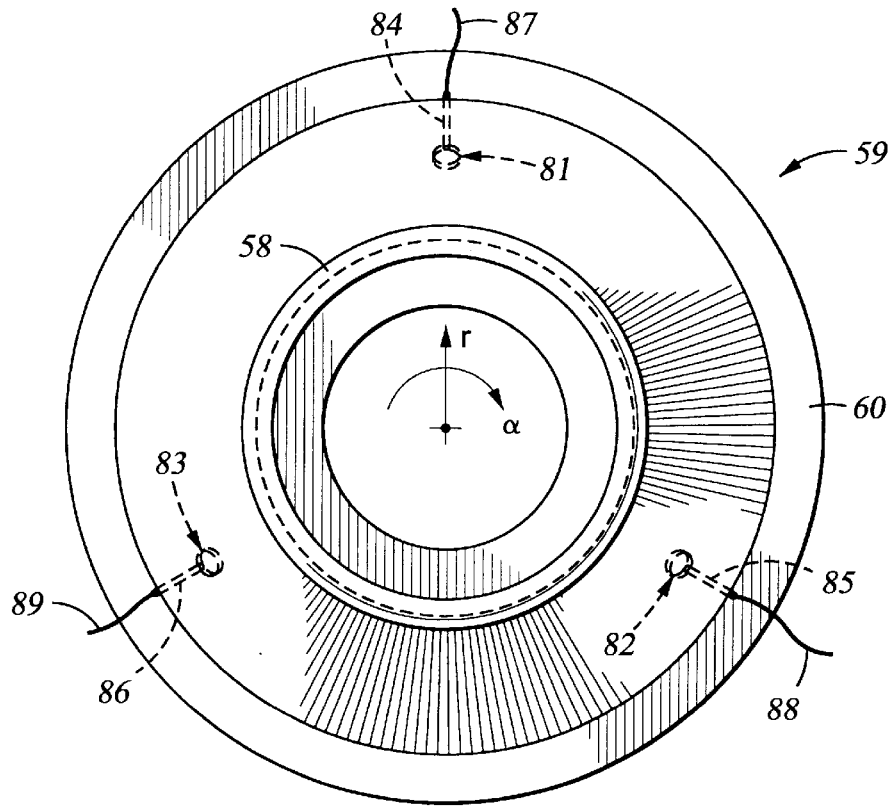
FIG. 4 is a plan view of the laminated elastomeric flex bearing introduced in FIG. 3.

During installation, the rear portion of the mooring porch 34 is welded or otherwise secured to the hull, and the tendon is inserted into load ring 41. As shown in FIG. 4, the mooring porch 34 may include a front slot generally designated 44 for ease of side entry of the tendon during installation.

Figure 3:
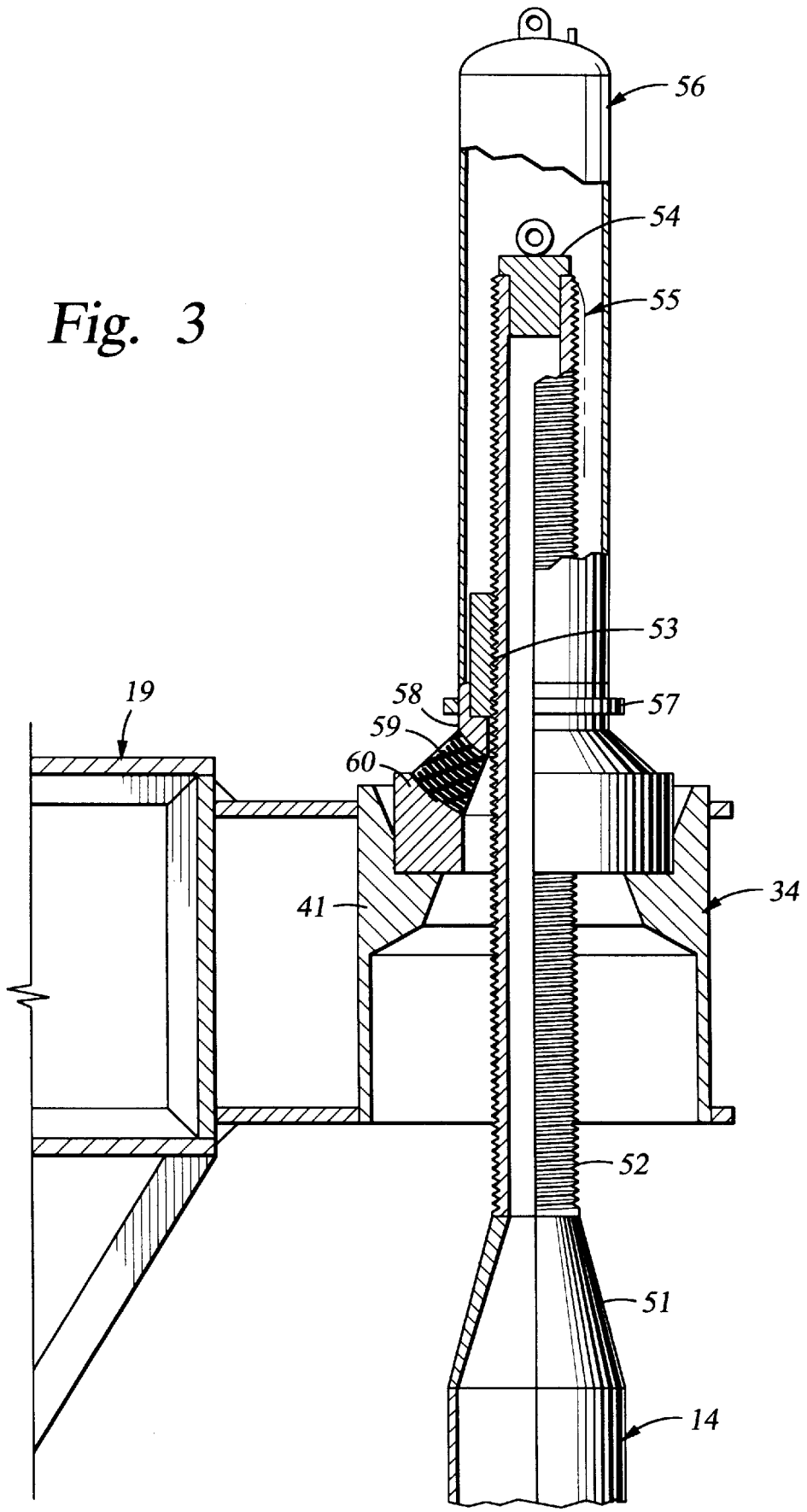
FIG. 3 is a schematic diagram, in partial section, showing a tendon top connector seated in a mounting porch subassembly secured to the floating marine platform of FIG. 1.

Referring now to FIG. 3, the tendon top connector 32 is seated in the mooring porch subassembly 34 secured to the hull 19 of the floating marine platform (not shown). The upper end portion of the tendon 14 is coupled by a transition joint 51 to an elongated threaded member 52 engaging a tie-off nut 53. The tie-off nut 53 is rotated with respect to the elongated threaded member 52 to perform the tendon length adjustment, and then a clamp 56 clamps the tie-off nut to an inner load ring 58 of an elastomeric flex bearing 59. An outer load ring 60 of the elastomeric flex bearing 59 is seated in the load ring 41 of the mooring porch 41. The upper end of the elongated threaded member 52 is capped by a top plug 54. An electrical cable 55 is connected to the top plug 54 for cathodic protection of the tendon 14. A corrosion cap 56 covers the upper end of the elongated threaded member 52 and the tie-off nut.

Figure 5:
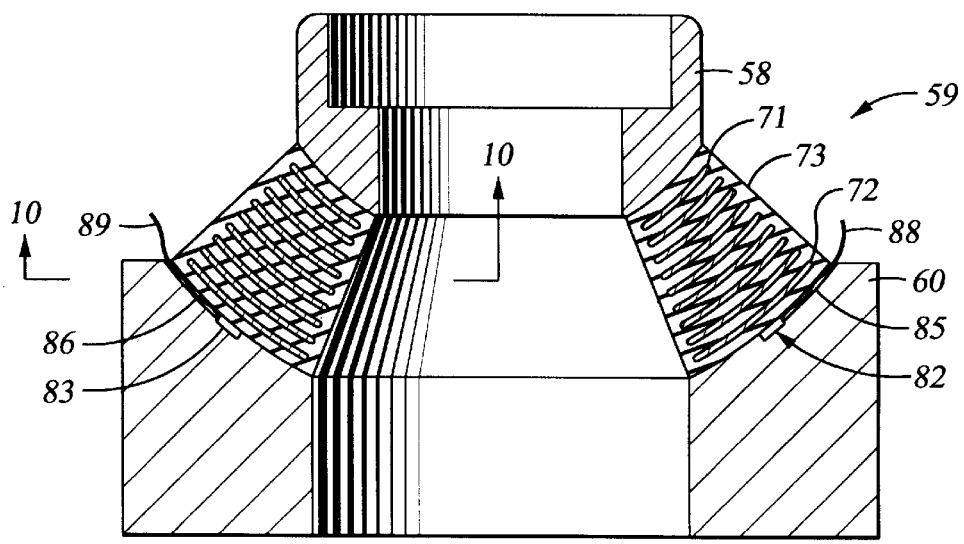
FIG. 5 is a longitudinal cross-section of the laminated elastomeric flex bearing of FIG. 4.

Referring now to FIGS. 4 and 5, there are shown more detailed views of the laminated elastomeric flex bearing 59. The bearing 59 includes nine annular semi-spherical metal reinforcement laminations such as an innermost lamination 71 and an outermost lamination 72 embedded in a matrix of elastomer 73. The components of the laminated elastomeric flex bearing 59 are integrally formed in a mold during the curing of the elastomeric 73. In accordance with an important aspect of the invention, force transducer components 81, 82, 83 are integrally formed in the elastomeric bearing. Preferably, these forced transducer components are mounted on a surface of one of the metal support rings 58, 60 bonded to the elastomer 73.

As shown in FIG. 5, the force transducer components 82, 83 are mounted on the outermost metal support ring 60. Force indicating signals from these transducers components are conveyed through respective slots 84, 85, 86 to respective signal conveying elements 87, 88, 89 leading to signal processing circuitry such as the circuitry which will be described further below with reference to FIG. 11. By embedding the signal conveying elements in slots in the load bearing face of the load ring 60, there is no need to drill holes in the load bearing ring 60 for conveying the force indicating signals.

The integration of pressure and/or shear measurement functions into the molded elastomeric bearing allows simplification and elimination of superfluous mechanical load bearing components such as load cells and load distribution rings for the load cells. The force transducer components 81, 82, 83 are also very well protected from the environment. Moreover, by embedding the force measurement components in the load bearing surface of the outer metal support ring, the transducers are fixed in position with respect to the outer metal support ring and therefore not subject to "set" which would change the transducer signals values for the same force from the tendon. The signal conveying elements 87, 88, 89 are more immune from any fatigue from the stress and strain variations in the elastomer 73.

Moreover, by embedding the force transducer components 81, 82, 83 in the load bearing surface of the outermost load ring 60 and curing the elastomer in contact with the force transducer components, the deleterious effect of set in the elastomer 73 is minimized. Variation due to set or aging of the elastomer can also be minimized by making the transducer components 82 have a diameter that is substantially large in comparison to the thickness of the elastomer layer between the outermost reinforcement 72 and the load bearing surface of the outer load ring 60. In this case the outermost reinforcement 72 will distribute a substantially representative portion of the overall force to each transducer component regardless of relatively inhomogeneous elastomer properties resulting from set or aging.

Figure 6:
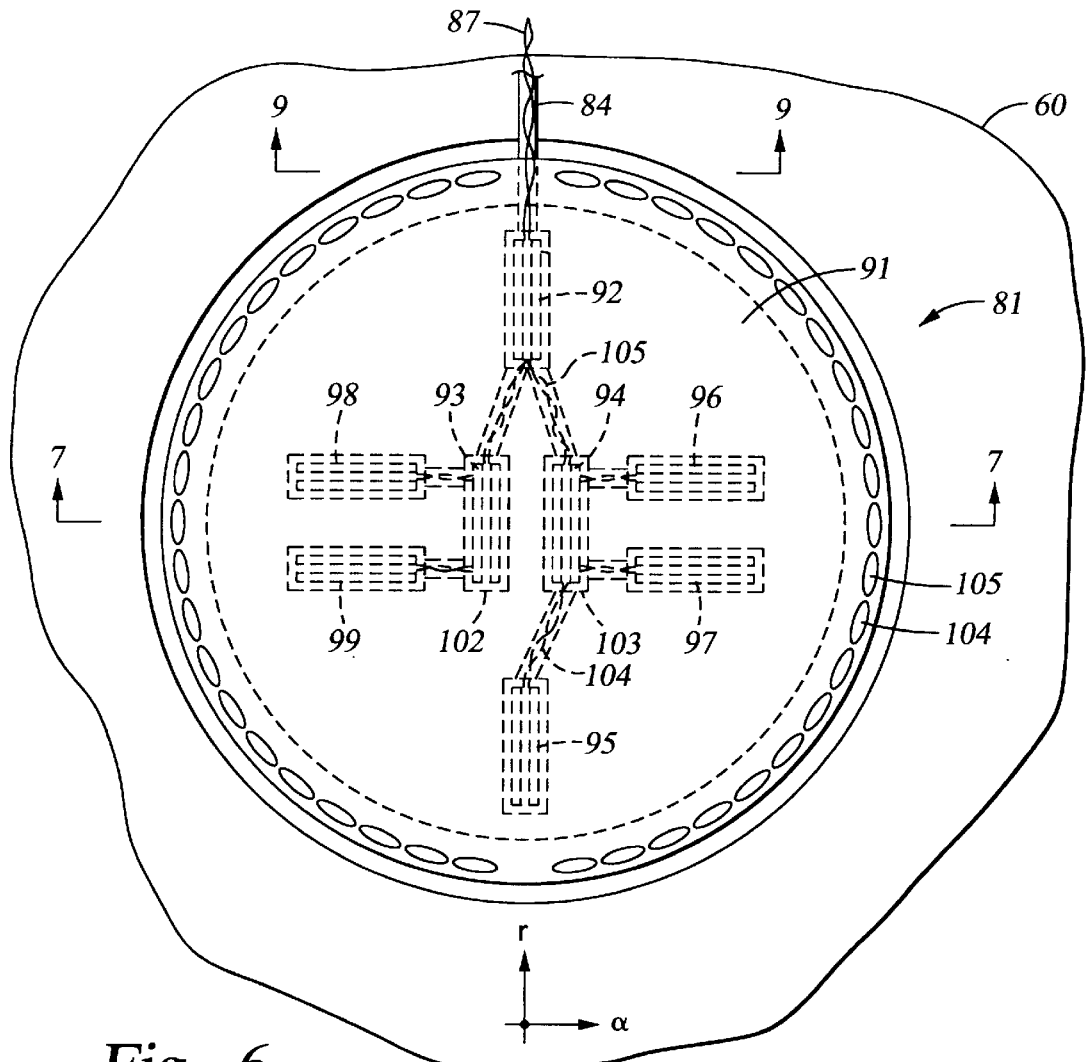
FIG. 6 is a plan view of a pressure and shear force transducer introduced in FIG. 4.

Turning now to FIG. 6, there is shown a plan view of a first embodiment for the force transducer 81. Because the force transducer 81 is integrally formed with the elastomeric bearing 59, it should be constructed so that it can perform satisfactorily over the lifetime of the laminated elastomeric bearing. The design in FIG. 6 uses a metal diaphragm 91 having an upper surface bonded to the elastomer of the bearing and a lower surface to which is mounted an array of strain gauges. The strain gauges, for example, are polyimid carrier foil strain gauges and include strain gauges 92, 93, 94, 95 to form a full bridge circuit for measuring pressure, and strain gauges 96, 97, 98, 99 for forming a full bridge circuit for measuring shear in the azimuthal direction as would be caused by rotation of the tendon (14 in FIG. 3).

Figure 7:
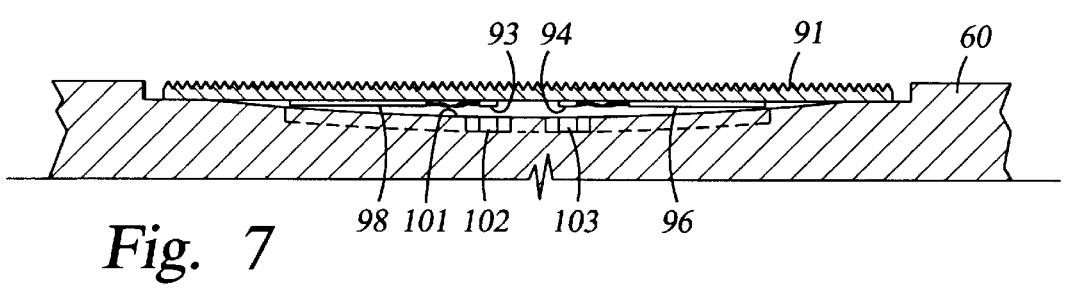
FIG. 7 is a cross-sectional view of the pressure and shear force transducer of FIG. 6 along line 7—7 in FIG. 6.

Referring to FIG. 7, the metal diaphragm 91 has a surface textured for bonding with the elastomer in the laminated bearing. The metal diaphragm 91, for example, is made of stainless steel and is textured by photolithographic etching. The diaphragm 91 is seated in a semi-spherical depression 101 in the load bearing surface of the outermost metal support ring 60. The metal diaphragm 91 is bonded to the metal support ring 60, for example, by a series of spot welds (101, 105) around its outer periphery.

Figure 8:
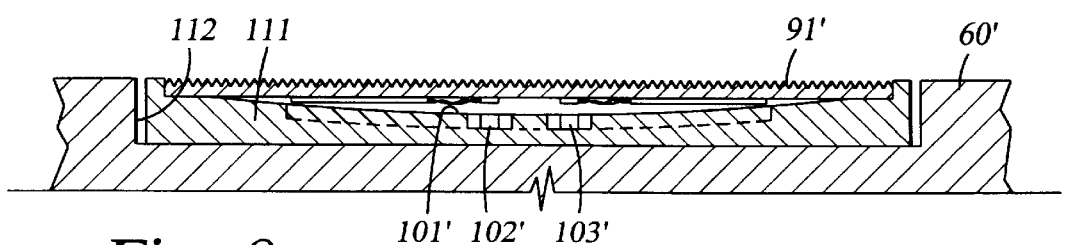
FIG. 8 is an alternative construction for the pressure and shear force transducer of FIG. 6.

For relatively large bearings, it may be inconvenient to grind or mill the load bearing surface of the outermost metal support ring 60. In this case, an alternative construction, as shown in FIG. 8, could be used. In this case, the metal diaphragm 91' is bonded to a backing disc 111 that is milled or ground to carry depressions 101', 102', 103', similar to the depressions 101, 102, 103 shown in FIG. 6 and 7. The support disc 11 in turn is received in a cylindrical depression 112 bored into the load supporting surface of the outer metal support ring 60'. The support disc 111, for example, is secured by epoxy adhesive to the metal support ring 60' before the molding and curing of the elastomer for the laminated elastomeric flex bearing.

Figure 9:
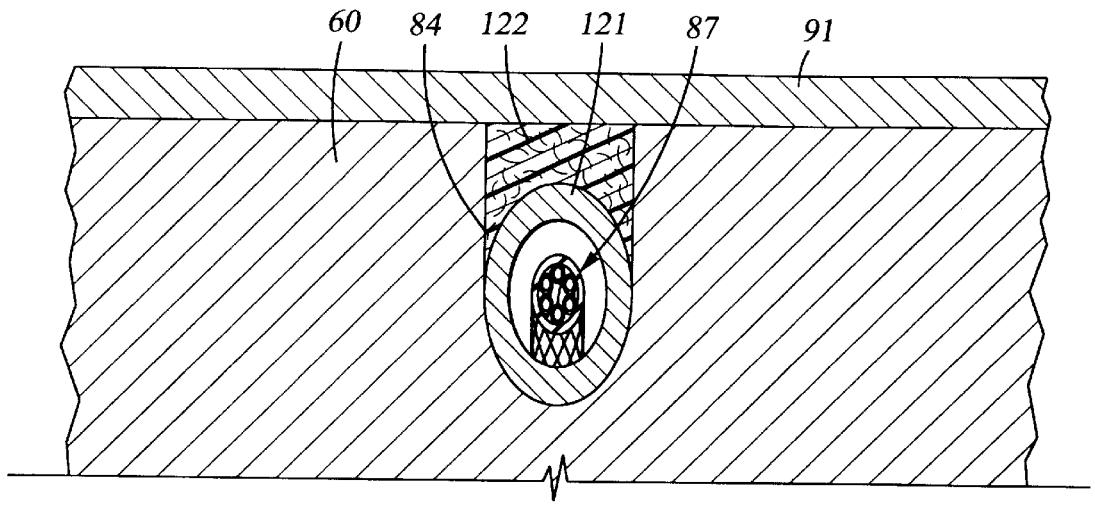
FIG. 9 is a cross-sectional view along line 9—9 in FIG. 6.

Referring now to FIG. 9, there is shown a detail of the slot 84 in the load bearing surface of the outer metal support ring 60. The force signal conveying element 87, which includes a plurality of insulated electrical wires, is protected by a metal tube 121 that is slightly crushed and secured by epoxy fiberglass 122 within the slot 84.

Figure 10:
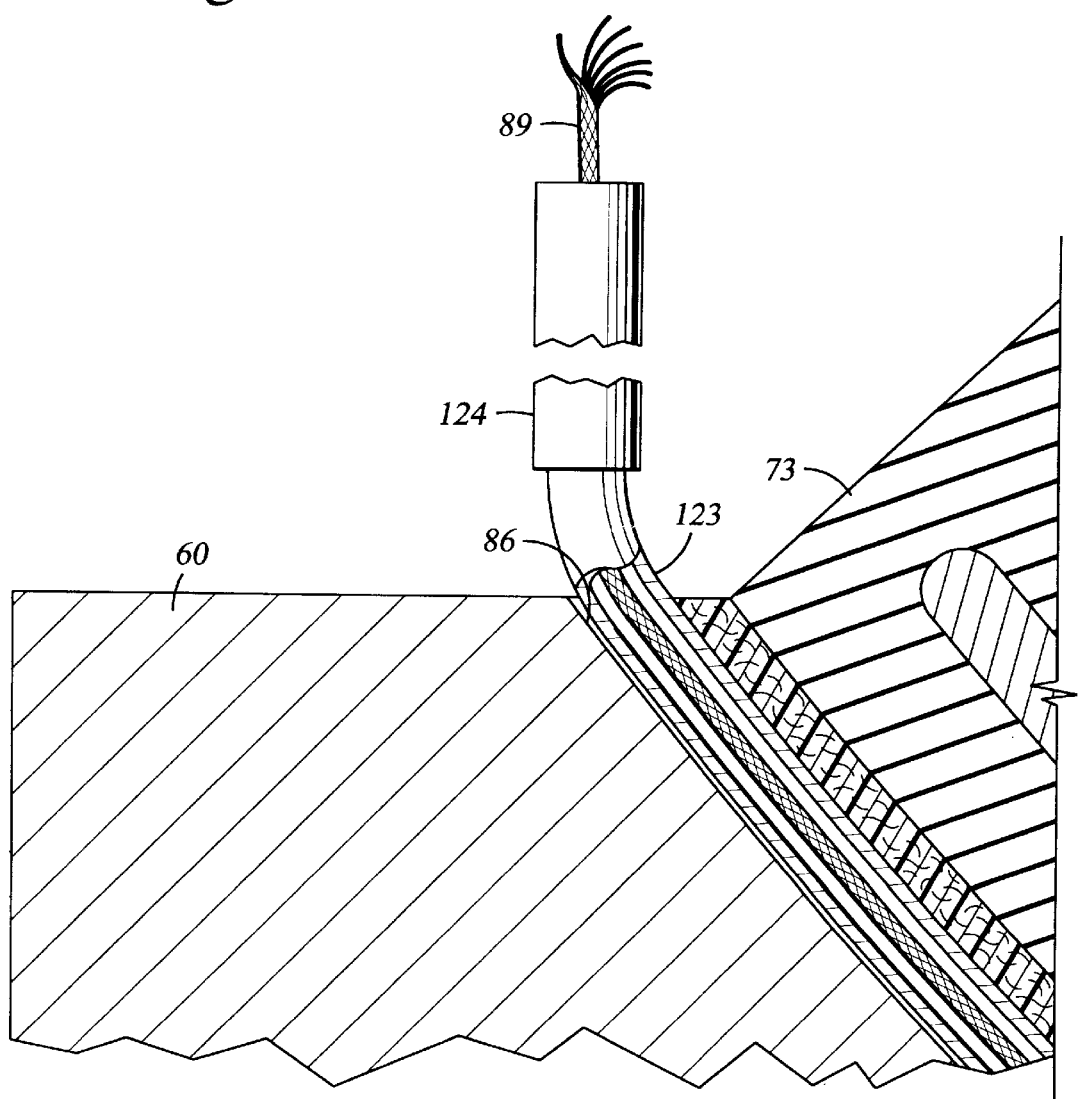
FIG. 10 is a cross-sectional view along line 10—10 of FIG. 5.

As shown in FIG. 10, the force indicating signal conveying element 89 is also a multiwire electrical cable protected by a metal tube 123. The metal tube 123 emerges from the outer metal support ring 60 and is coupled to plastic or rubber tubing 124, which further protects the electrical cable 89 as the electrical cable is routed to the electronic circuits of FIG. 11.

Figure 11:
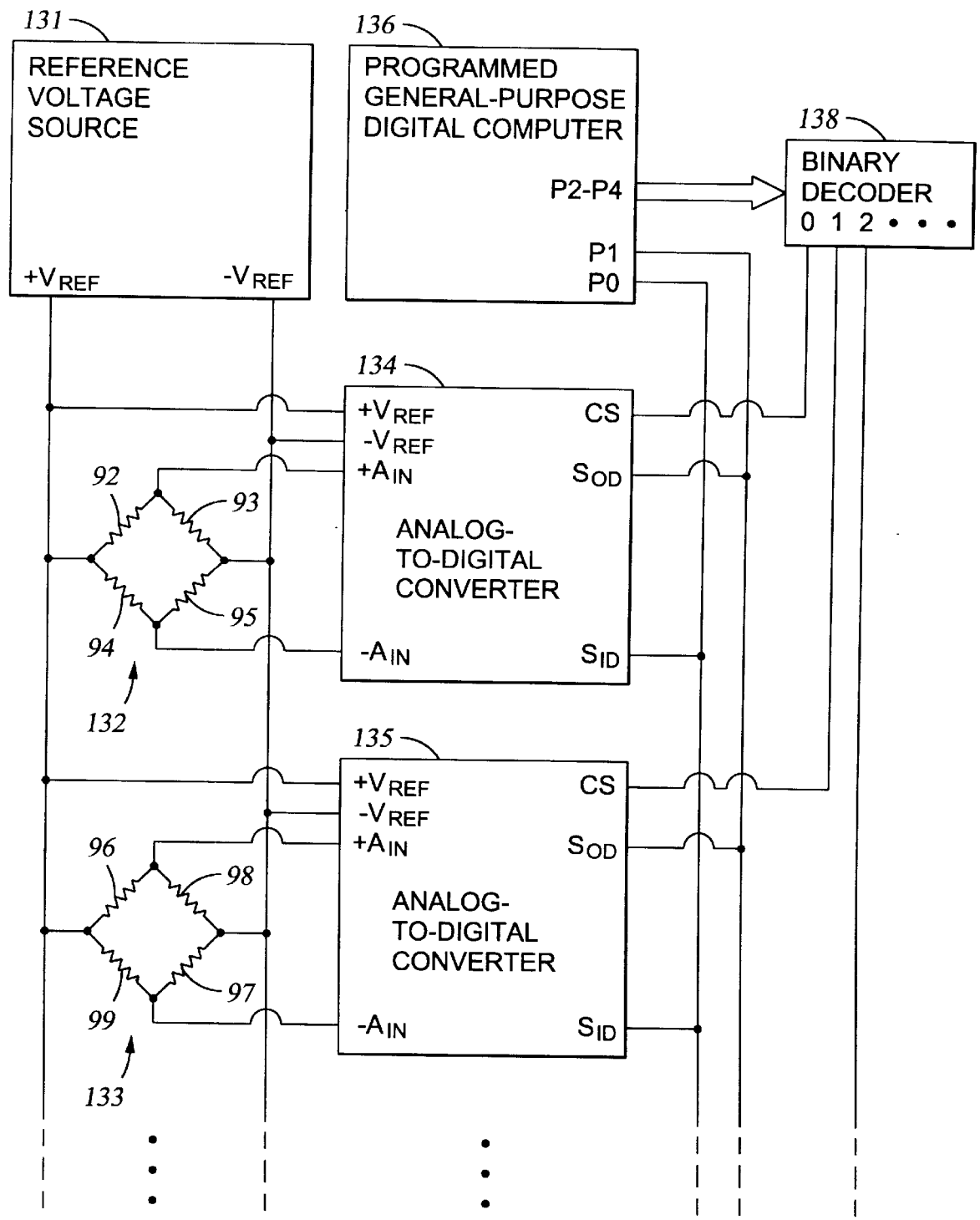
FIG. 11 is a schematic diagram of analog and digital electronic circuits associated with the pressure and shear force transducer of FIG. 6.

Referring now to FIG. 11, the electronic circuits include a reference voltage source 131 for providing reference voltages $+V_{REF}$, $-V_{REF}$ such as ±5 V to the strain gauge bridge circuits 132, 133 including the strain gauges 92, 93, 94, 95 and 96, 97, 98, 99, respectively, of the transducer 81 of FIG. 6. An analog to digital converter 134 converts the pressure signal from the bridge circuit 132 to a digital value, and an analog to digital converter 135 converts the shear force or torque signal from the bridge circuit 133 to a respective digital value. Four additional bridge circuits and analog-to-digital convertors (not shown) are associated with the other two force transducers 82, 83 shown in the laminated bearing 59 of FIG. 4.

A general purpose digital computer 136 has an input/output port having a first I/O line (P0) programmed as a data output to write a serial data stream, a second I/O line (P1) programmed as a data input to receive a serial data stream, and third to fifth I/O lines (P2–P4) programmed as data outputs to supply a selection signal to a binary decoder 138 which enables a selected one of the analog-todigital converters 134, 125, etc. In this fashion, the general-purpose digital computer can obtain a pressure or torque reading from a selected one of the bridge circuits. Each of the analog-to-digital convertors 134 is a single integrated circuit, for example, such as a Crystal Semiconductor Corporation bridge transducer analog-to-digital convertor part number CS5516 sold by Crystal Semiconductor Corporation of Austin, Tex. 78760.

One disadvantage of the strain gauge transducer 81 of FIG. 6 is that its accuracy may degrade over time and it is not possible to calibrate the transducer after the elastomeric bearing 59 is installed in the field unless the elastomeric bearing is removed from its field installation and placed in a test fixture which can apply a known load. Therefore, for a particularly critical application such as export or production risers, one may wish to use a force transducer which can be calibrated in situ, without removing the bearing from its field installation or applying a known load to the bearing.

Figure 12:
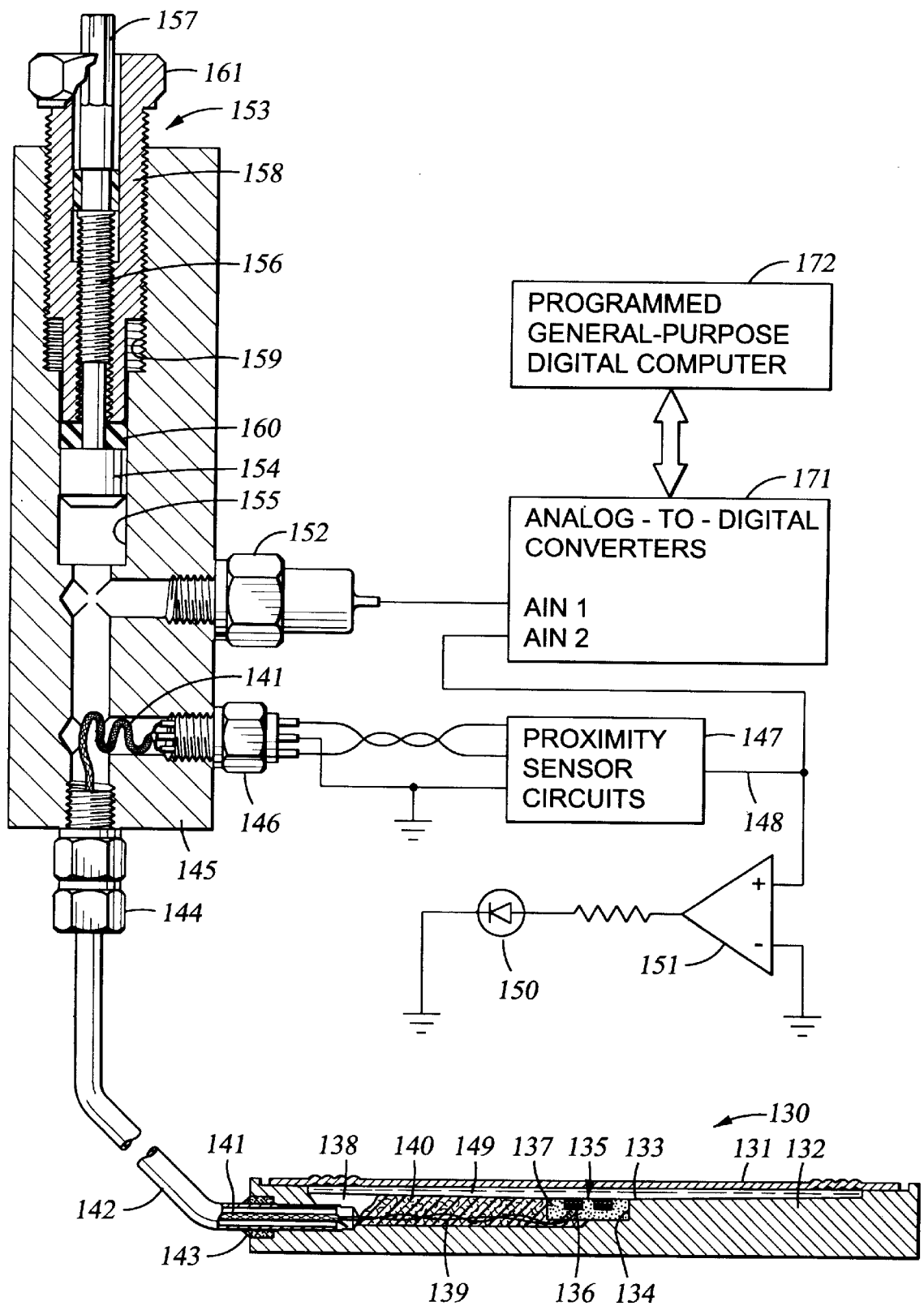
FIG. 12 is a schematic diagram, in partial section, of an alternative pressure transducer employing hydraulic signals for conveying pressure information from a transducer component integrated in the elastomeric bearing to an external and replaceable pressure transducer.
Figure 13:
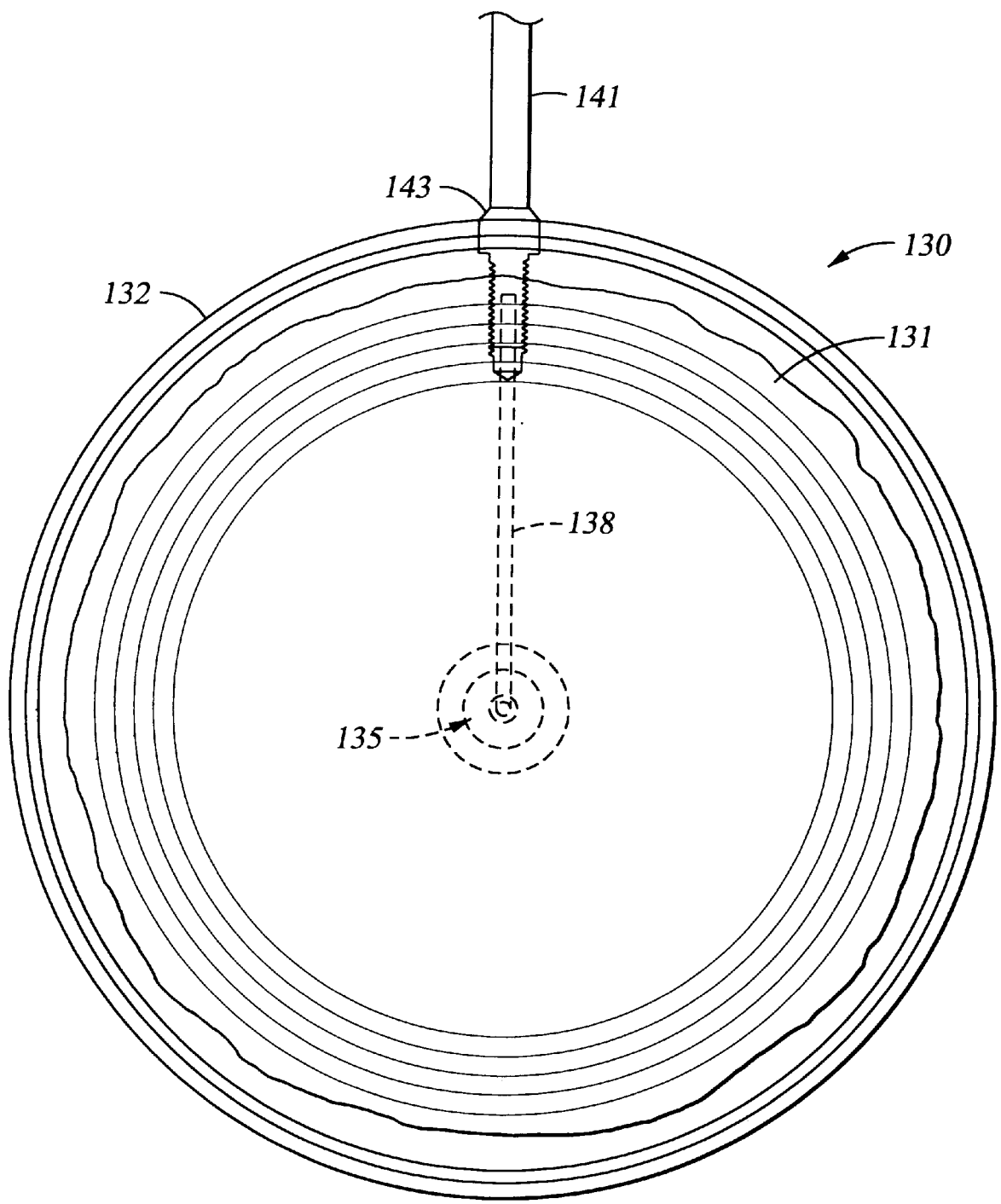
FIG. 13 is a plan view of the transducer components of FIG. 12 which are integrated with the elastomeric bearing.

A transducer system for in situ calibration is shown in FIG. 12. In this case, a force transducer component 130 is integrated with the laminated bearing. The force transducer component 130 includes a metal diaphragm 131 hermetically sealed by peripheral welding to a metal support disc 132. The metal support disc 132 is formed with a shallow, cylindrical depression 133 and a central cylindrical bore 134 for receiving an inductive proximity sensor 135 for sensing the length of the gap between the bottom of the cylindrical depression 133 and the diaphragm 131. The proximity sensor 135 includes a winding 136 of insulated copper wire around an iron powder core 137. A slot 138 is milled into the support disc 132 to provide a passage for a pair of wires 139 from the coil 136. The wires 139 are secured in the slot 138 by fiberglass epoxy 140. The wires 139 extend from a shielded, twisted pair of cable 141 within a metal hydraulic line 142. An end portion of the hydraulic line 142 is threaded into the support disc 132 and hermetically sealed by brazing alloy 143.

The hydraulic line 142 extends from the laminated bearing (not shown) in a fashion similar to the metal tube 123 shown in FIG. 10. From the laminated bearing, the hydraulic line 142 extends to a connector 144 securing the hydraulic line to a metal manifold block 145. The manifold block 145 conveys the shielded twisted pair 141 to an electrical connector plug 146 for electrically connecting the shielded twisted pair 141 to conventional proximity sensor circuits 147. The proximity sensor circuits 147, for example, include a bridge circuit in which the coil 136 of the proximity sensor 135 comprises one arm of the bridge. This bridge circuit is excited by an alternating electrical signal in the kilohertz range, and the output of the bridge is detected to provide an analog signal on an output line 148. The bridge circuit including the proximity sensor coil 137 is adjusted so that the output line 148 carries a voltage of 0 volts when the metal diaphragm 131 is in an unbiased position. An indicator such as a light-emitting diode 149 is driven by a voltage comparator 151 which compares the voltage on the output line 148 to ground potential. Therefore, the indicator 149 can indicate the direction of any bias of the diaphragm 131 away from its unbiased position.

The metal manifold block 145, the hydraulic line 142, and the space between the proximity sensor 135 and the metal diaphragm 131 are filled with hydraulic fluid 149. The pressure of the hydraulic fluid is sensed by a millivolt-type fluid pressure sensor 152 such as a 302 series semiconductor full bridge gauge transducer from Omega Engineering, Inc., Stamford, Conn. 06907. A wrench-operated hydraulic pump generally designated 153 is also assembled into the metal manifold block 145. The hydraulic pump 153 includes a piston 154 tightly fitted within a cylinder 155 bored into the metal manifold block 145. The piston is carried by an inner threaded shaft 156 having an upper end portion 157 that is fluted in a hexagonal shape for engaging a wrench (not shown). The inner threaded shaft 156 engages internal threads in an outer threaded shaft 158. The outer threaded shaft 158 has external threads engaged in a threaded bore 159 in the metal manifold block 145. A packing seal ring 160 is disposed between the piston 154 and a lower end portion of the hollow threaded shaft 158. The upper end portion of the threaded adjusting shaft 158 is formed with a hex head 161 for engaging a wrench (not shown).

In operation, the pump 153 can be adjusted by first loosening the packing seal 160 by turning the inner threaded shaft 156 with respect to the outer threaded shaft 158. Then the outer threaded shaft is turned with respect to the metal manifold block 145 to translate the piston 154 within the cylinder 155. Once the piston 154 is moved to a new position, it can be locked into place by turning the inner threaded shaft 156 with respect to the hollow threaded shaft 158 to squeeze the packing ring 160 in a longitudinal direction so that the packing ring 160 expands in a radial direction against the cylinder 155.

So long as there is a gap between the diaphragm 131 and the metal support disc 132, the pressure applied by the elastomer in the laminated elastomeric bearing (not shown) will be approximately equal to the pressure of the hydraulic fluid as sensed by the pressure sensor 152. The proximity sensor 135 can therefore be used to determine whether or not there is a sufficient amount of hydraulic fluid between the diaphragm 131 and the metal support disc 132 in order for the fluid pressure sensor to accurately sense the pressure applied by the elastomeric bearing. Moreover, the signal from the proximity sensor circuits could be used to provide a small correction to the fluid pressure for any resiliency of the diaphragm 131. The proximity sensor signal 148 can also be used to sense any loss of hydraulic fluid from the system. This loss of hydraulic fluid can be made up by adjusting the pump 153 to drive the piston 154 further into the bore 155.

The fluid pressure sensor 152 can be removed and replaced and the system recalibrated in situ without removing any unknown load upon the elastomeric bearing. When a new fluid pressure sensor 152 is inserted into the metal manifold block 145, for example, the hydraulic pump 153 can be entirely removed from the metal manifold block 145 to fill the bore 155 with hydraulic fluid lost during the removal of the fluid pressure sensor 152. Then, the pump 153 can be reinserted into the metal manifold block 145 and used to drive hydraulic fluid into the system until the proximity sensor circuits 147 provide an output voltage of approximately zero volts indicating the desired condition in the transducer 130. The light-emitting diode 150 provides a visual indicator to a maintenance person while the maintenance person adjusts the hydraulic pump 153. Once the desired condition is obtained, the inner threaded shaft 156 is turned with respect to the outer threaded shaft 158 to lock the packing seal ring 160 within the cylinder 155.

As further shown in FIG. 12, the millivolt signal from the fluid pressure sensor 152 and the analog signal on the line 148 from the proximity sensor circuits 147 are received by respective analog inputs AIN1 and AIN2 of a bank of analog-to-digital convertors 171 so that a programmed general purpose digital computer 172 can read a corresponding pressure value and proximity value.

Figure 14:
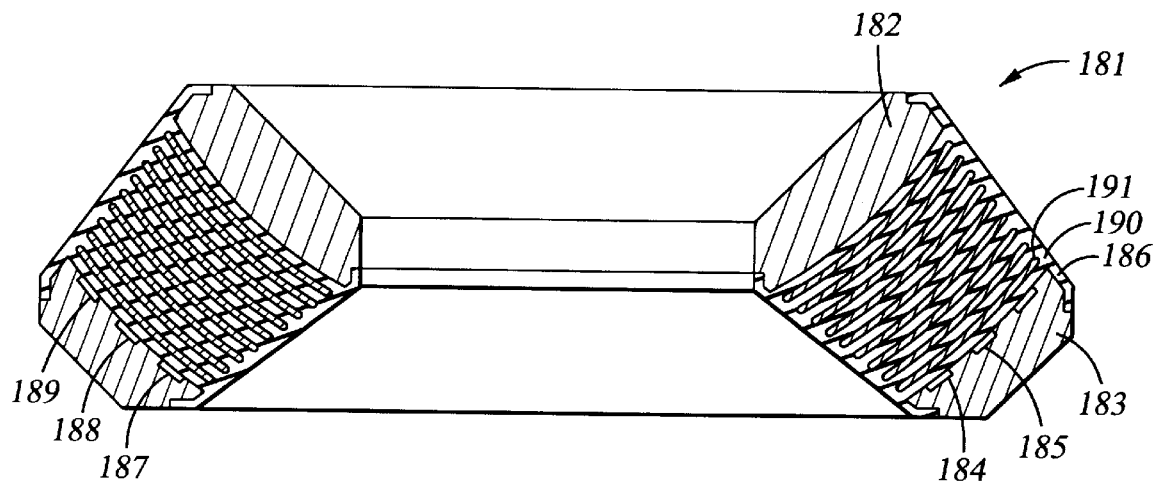
FIG. 14 is a longitudinal cross-section of a laminated elastomeric flex bearing especially designed for sustaining very high axial loads.

Referring now to FIG. 14, there is shown an alternative construction of a laminated elastomeric flex bearing. The configuration of the bearing 173 is suitable for very large sizes, high loads, and tension member deflections ($\theta_T$ in FIG. 23) of up to at least 10°. The inner metal support ring 182 and outer metal support ring 183 are shaped to reduce the weight of the metal support rings.

Figure 15:
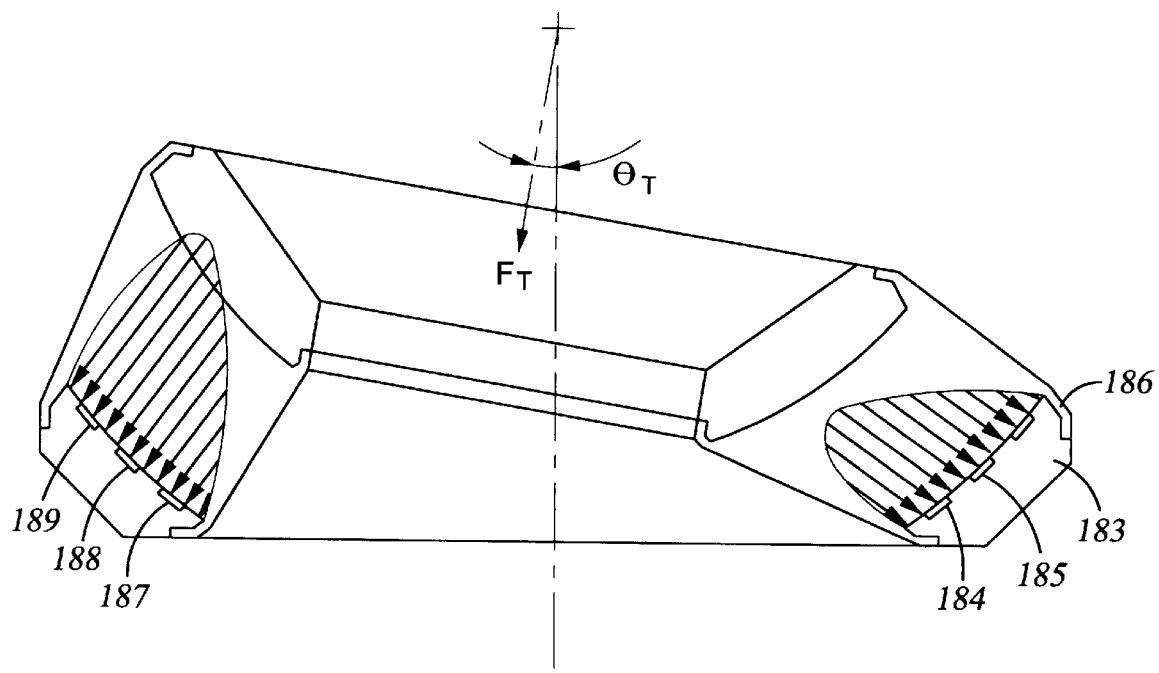
FIG. 15 shows a load distribution on an outer metal support ring of the laminated elastomeric flex bearing of FIG. 14 for an axial load combined with an angular deflection.

The bearing 173, in contrast to the bearing 59 of FIG. 5, is likely to have a more non-uniform stress distribution in the radial direction, especially when subjected to an axial load combined with an angular deflection as shown in FIG. 15. Therefore it may be desirable to mount multiple force transducer components 184, 185, 186, 187, 188, 189 on the outer metal support ring 183 at each angular position at respective different radial positions. As shown in FIG. 14, for example, three force transducer components are mounted at each angular position at respective different radial positions, and the elastomer 190 between the outer metal reinforcement lamination 191 and the outer metal support ring 183 is integrally molded into contact with each of the force transducer components.

In practice, force signals from the plurality of force transducer components at each angular position can be averaged together to provide a single signal processed in a fashion similar to the single signal from each of the transducers 81, 82, 83 shown in FIG. 4. This averaging process enhances the signal-to-noise ratio and therefore the resolution of the force measurement. For this reason, it may be desirable to mount multiple force transducer components at each angular position in an elastomeric bearing such as the bearing 59 in FIG. 5 for the purpose of providing increased resolution.

Figure 16:
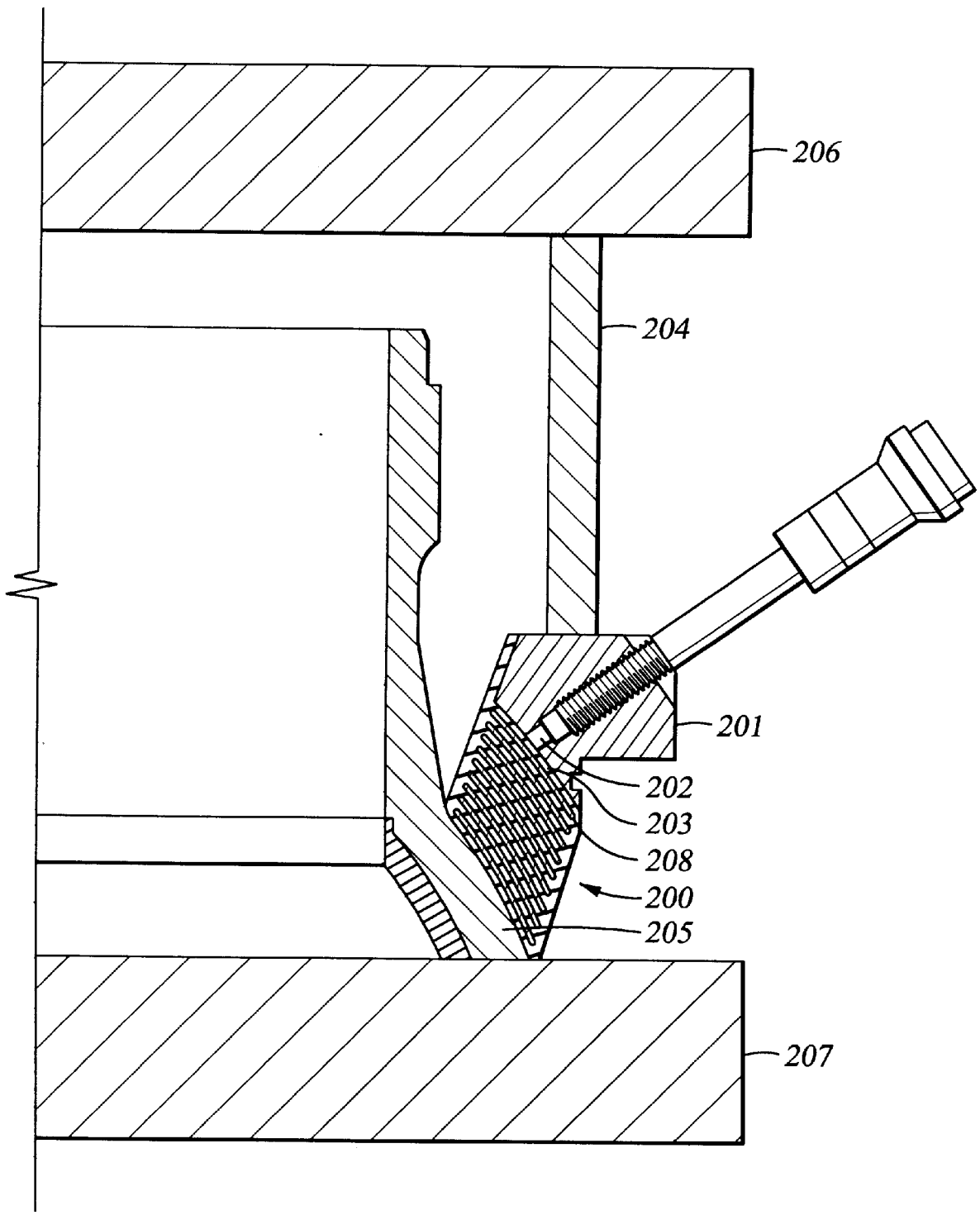
FIG. 16 is a cross-sectional view of another laminated elastomeric flex bearing installed in a test fixture and having a replaceable contact-type pressure sensor.

With reference to FIG. 16, a test was conducted to determine the feasibility of measuring axial loading of a laminated bearing 200 by means of rubber pressure and/or strain transducer components integrated in the laminated bearing. The laminated bearing 200 was an 8" Lockseal type laminated bearing part No. 299954 having nine reinforcements 0.048" thick, and 10 rubber interlayers 0.080" thick each. The rubber compound was 390–70 acrylonitrile-butadine copolymer. The back flange 201 was modified to allow flush diaphragm type pressure transducers (such as the transducer 202) to be installed on the surface of the elastomer interlayer 203 adjacent to the back flange 201. The seal rubber on the bottom of the nipple spherical radius was ground flat to allow contact with the base of the nipple during testing. A steel ring 204 was used to apply compression load on the back flange 201. The steel ring 204 and the bearing's inner bonded metal support ring 205 were placed between load bearing members of a 100 kip MTS test frame and load cell.

Two types of sealed pressure transducers were employed. The first was Omega melt pressure transducers PH PX330J-3KGV rated 0 to 3000 psi. The second type was Sensotec PN BP321 rated 10 to 10000 psi. Both types of transducers were millivolt output. These transducers were approximately centered on the interlayer 203. Plugs (not shown) were used to seal the transducer ports in the outer metal support ring 201 during molding of the laminated bearing 200. After molding the transducers were installed with positive contact pressure on the rubber surface.

Monitoring of the transducers was done using a 6 volt power supply and a digital meter displaying millivolts. Calibration to pressure was achieved in advance for each transducer using a hydraulic dead weight test fixture with a range of 0 to 5000 psi.

Figure 17:
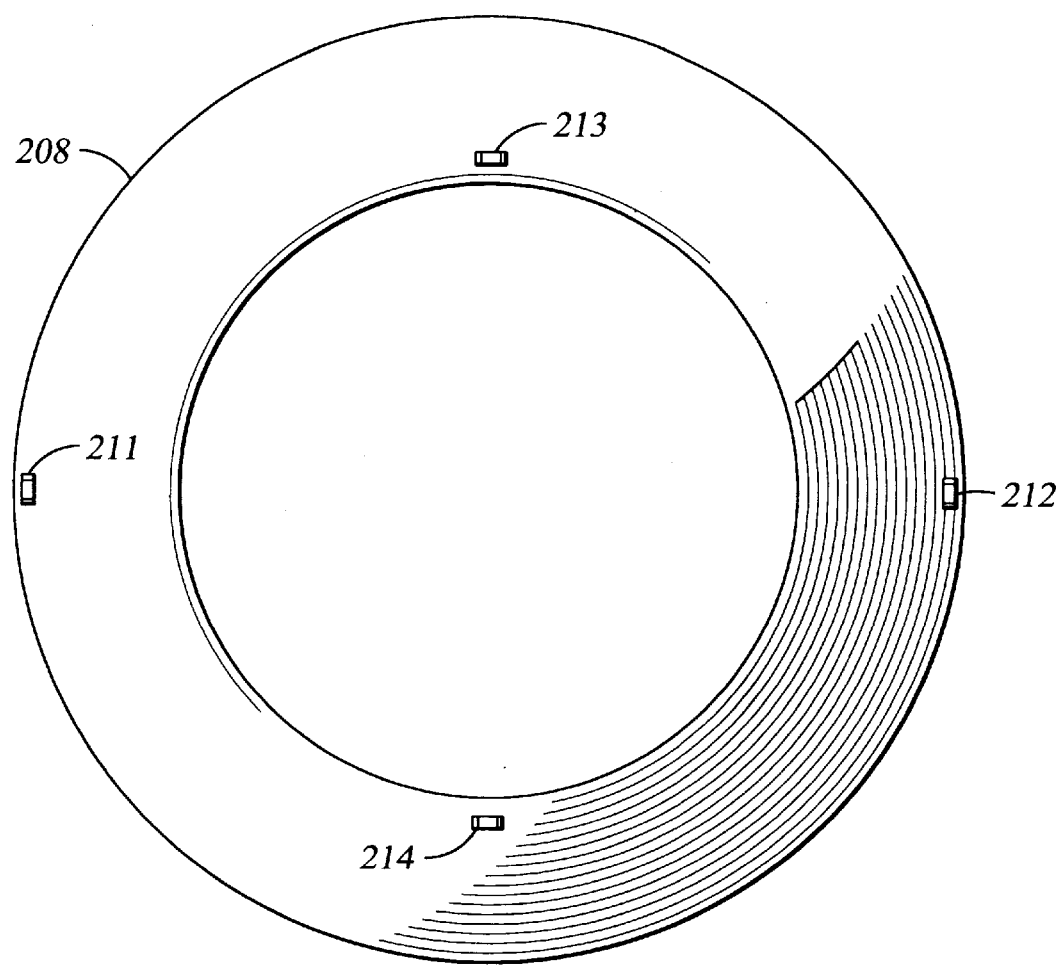
FIG. 17 is a plan view of an outer one of the metal reinforcement laminations in the laminated elastomeric flex bearing of FIG. 16.
Figure 18:
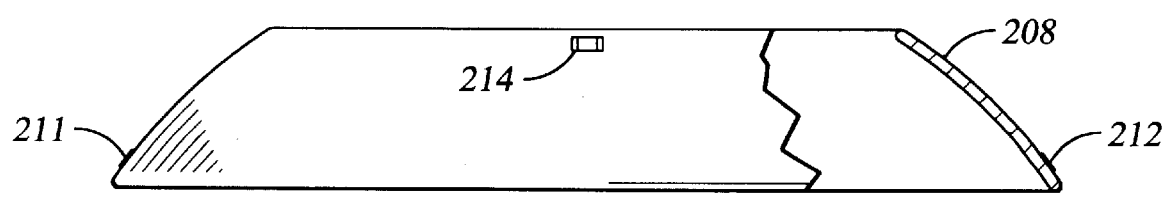
FIG. 18 is a side view, and partial section, of the metal reinforcement lamination of FIG. 17.

As shown in FIGS. 16 and 17, four Micro-Measurements strain gages part No. CEA-06-2250UW-120 were installed on the laminated metal reinforcement 208 adjacent to the back flange (201 in FIG. 16). Two strain gages 211, 212 were positioned radially 180 degrees apart near the outer diameter and two strain gages 213, 214 were positioned 180 degrees apart near the inner diameter. The strain gages were monitored using a Micro-Measurements strain indicator and 10 station switch box.

The 100 kip MTS test frame and load cell was used at 20% load setting and 10% stroke setting. Initially the laminated bearing 200 was cycled four times to 10,000 pounds and the fourth cycle load and deflections were recorded to determine that the spring rate for a change of loading from 9000 to 1000 pounds was 571,429 #/in.

Figure 19:
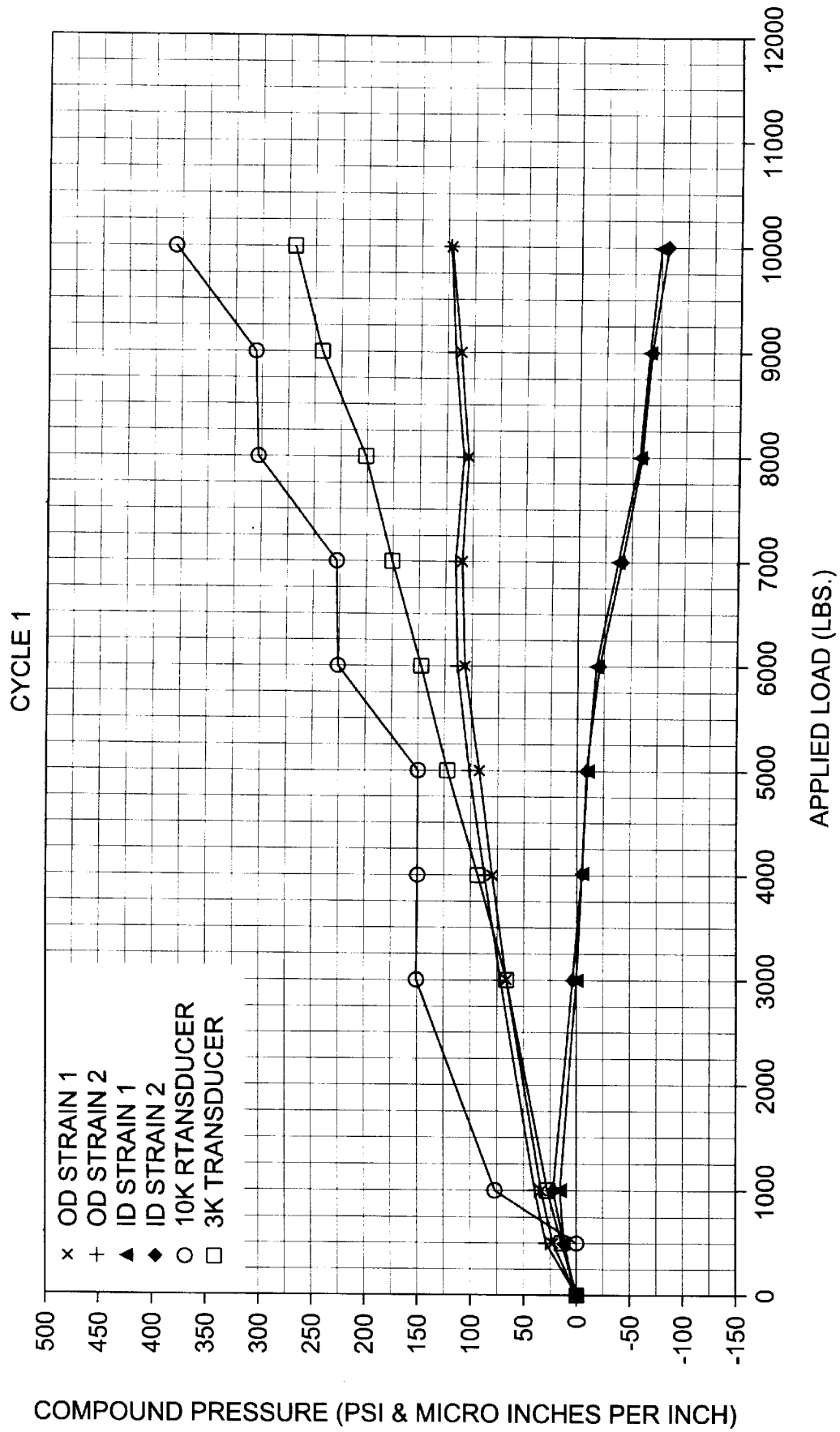
FIG. 19 is a graph of pressure and strain versus applied load for a first test cycle using the test fixture of FIG. 16.

In a first test cycle, we monitored all four strain gages and one each of the 3000 and 10,000 psi rated pressure transducers. First baseline values were recorded at zero load then pressure was applied in steps by manually adjusting the load control. Readings were taken at each step. FIG. 19 shows load verses microstrain and load verses pressure for each transducer.

The pressure transducers indicated between 270 and 380 psi at 10,000 pounds load. Both appeared to be somewhat linear. It was apparent however that the 10,000 psi unit resolution was too coarse for use at these loads.

The strain gages were tightly grouped according to location. The two gages near the outer diameter indicated positive microstrain but flattened out at about 6000 pounds loading. The two gages near the inner diameter initially indicated positive microstrain but soon reversed and at 3000 pound loading dropped into compression.

Figure 20:
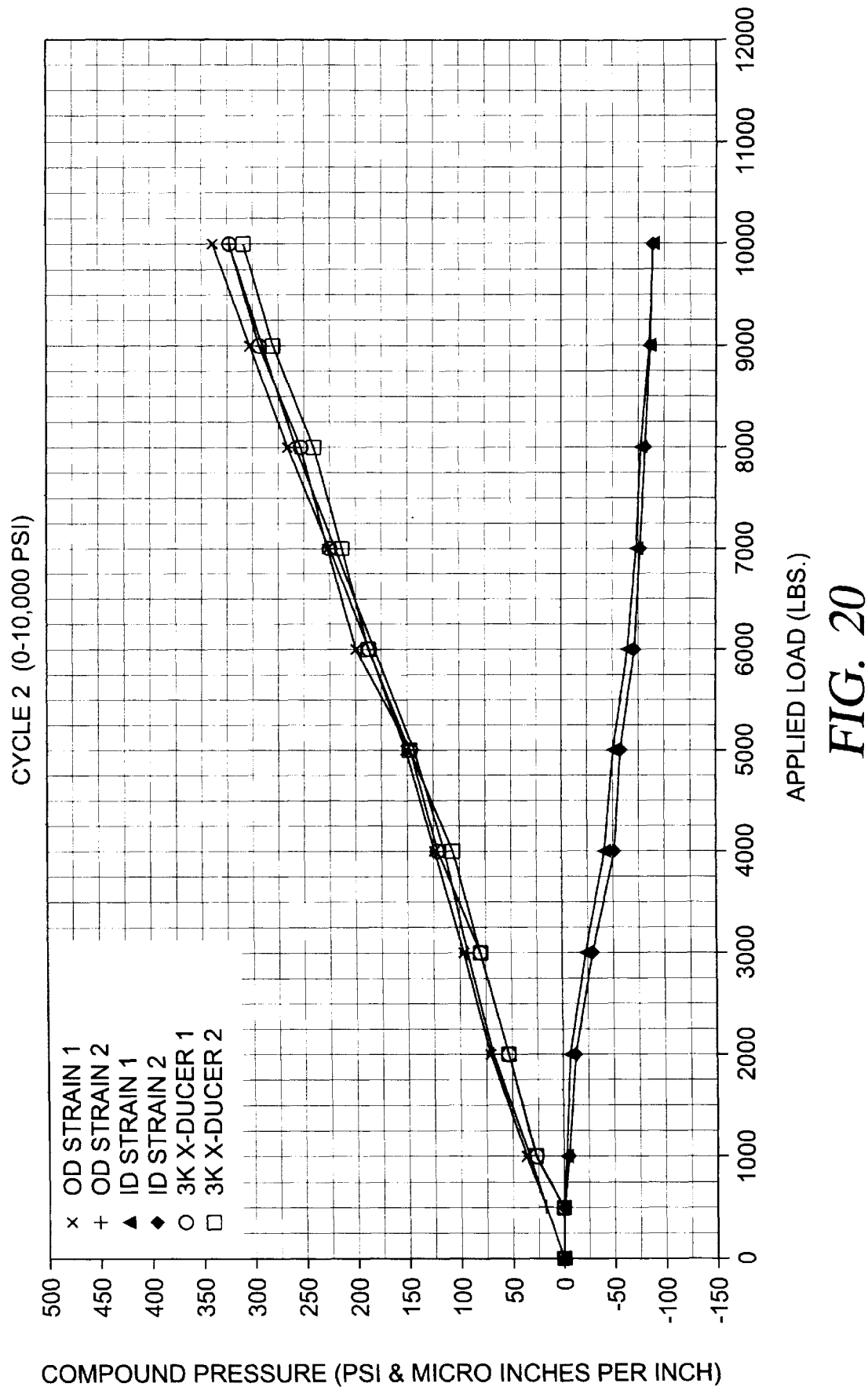
FIG. 20 is a graph of pressure and strain versus applied load for a second test cycle and a range of 0 to 10,000 PSI from the test fixture of FIG. 16.
Figure 21:
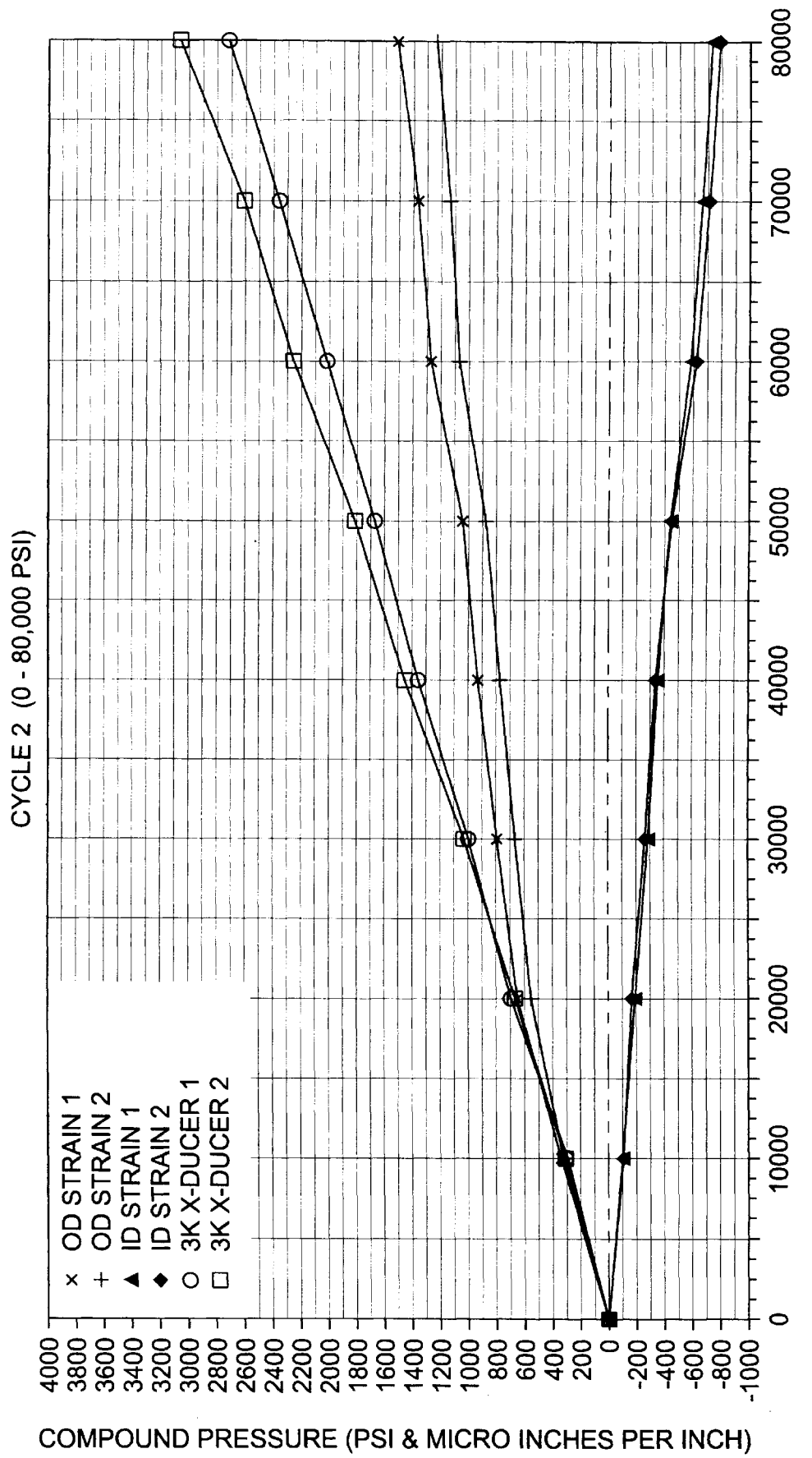
FIG. 21 is a graph of pressure and strain versus applied load for a second test cycle over a range of 0 to 80,000 PSI from the test fixture of FIG. 16.

In a second test cycle, after the laminated elastomeric bearing 200 sat unloaded overnight, we decided to use two 3000 psi transducers and replace the strain indicator with a new digital unit. We also decided to load the part to 80,000 pounds (60% of hydrotest load) recording data in 1000 pound increments. Transducer readings from 0 to 10,000 were consistent with cycle 1 however strain readings were more linear, probably due to the digital indicating unit. FIG. 20 shows the results from 0 to 10,000 pounds. FIG. 21 shows the results from 0 to 80,000 pounds.

Figure 22:
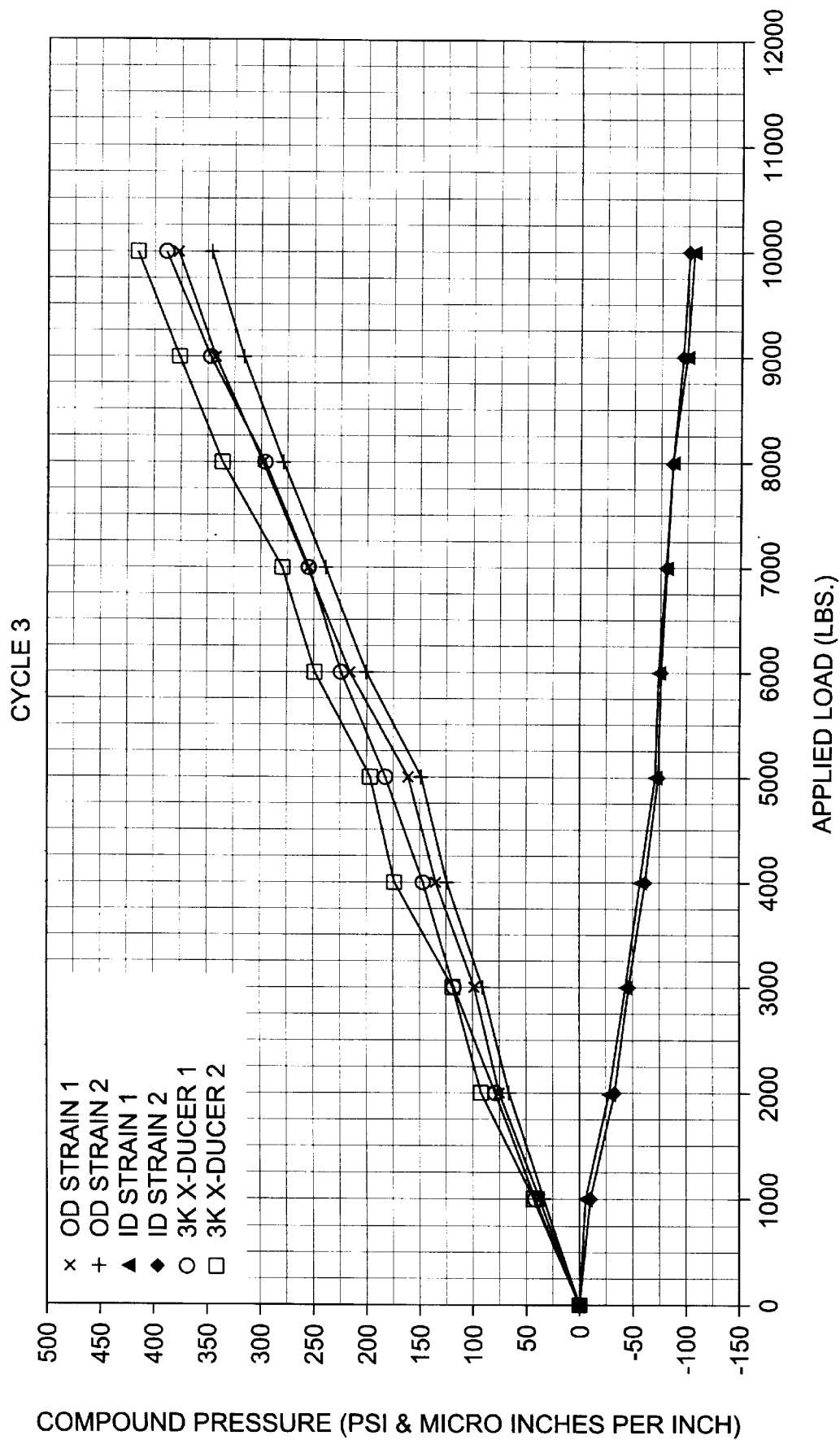
FIG. 22 is a graph of pressure and strain versus applied load for a third test cycle from the test fixture of FIG. 16.

We performed a third test cycle immediately after the second test cycle. The second test cycle test results indicated higher readings than previous which may have been due to set in the element. Linearity was good; however, as shown in FIG. 22, readings were not as tightly grouped.

Figure 23:
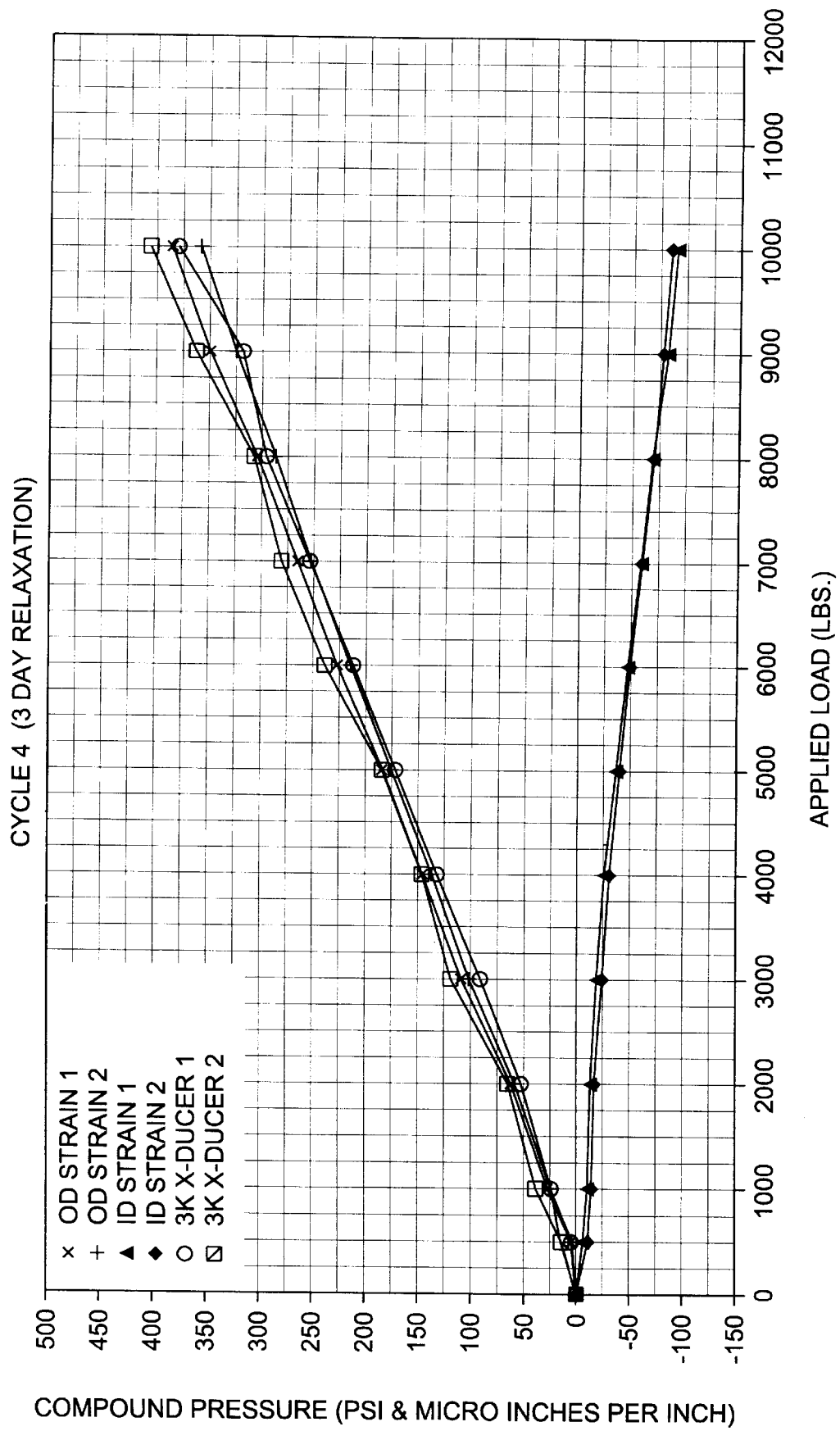
FIG. 23 is a graph of pressure and strain versus applied load for a fourth test cycle from the test fixture of FIG. 16.

We performed a fourth test cycle three days after the third test cycle. No load was applied to the laminated bearing during this three-day period. The fourth cycle spring rate for a change in loading from 9000 to 1000 pounds was 610,687 #/in, an increase of 6.9% over the first test cycle. The laminated bearing was then tested to 10,000 pounds. As shown in FIG. 23, the results were consistent with the third test cycle results of FIG. 22.

The millivolt output rubber pressure transducers were repeatable and linear. A significant change occurred after the 80,000 pound test indicating a set in either or both the rubber and transducers. The strain gages also reflected this change.

The strain gage readings were dependent upon location with best results obtained at height strain location. The outer-diameter location strain gage outputs appear very consistent. The strain gages at the inner-diameter locations gave less consistency and less linearity. Sensitivity and linearity improved dramatically after switching to the digital indicator. In general, axial load can be directly correlated from either rubber pressure or reinforcement strain with a fair degree of accuracy.

In practice, the signals from the force transducer components integrated into the elastomeric flex bearings are used to determine force on an elongated tension member and/or the direction of the elongated tension member. The force and/or direction can be used to warn the operators of a floating offshore platform of an improper condition of a tendon or riser system, so that the condition can be corrected by a tension adjustment for the tension member, a change in platform ballast, a change in the lateral position or orientation of the platform by adjusting mooring lines or control of platform thrusters, or by scheduling repair or reconfiguration of the tension member or its top connector assembly.

Figures 24, 25:
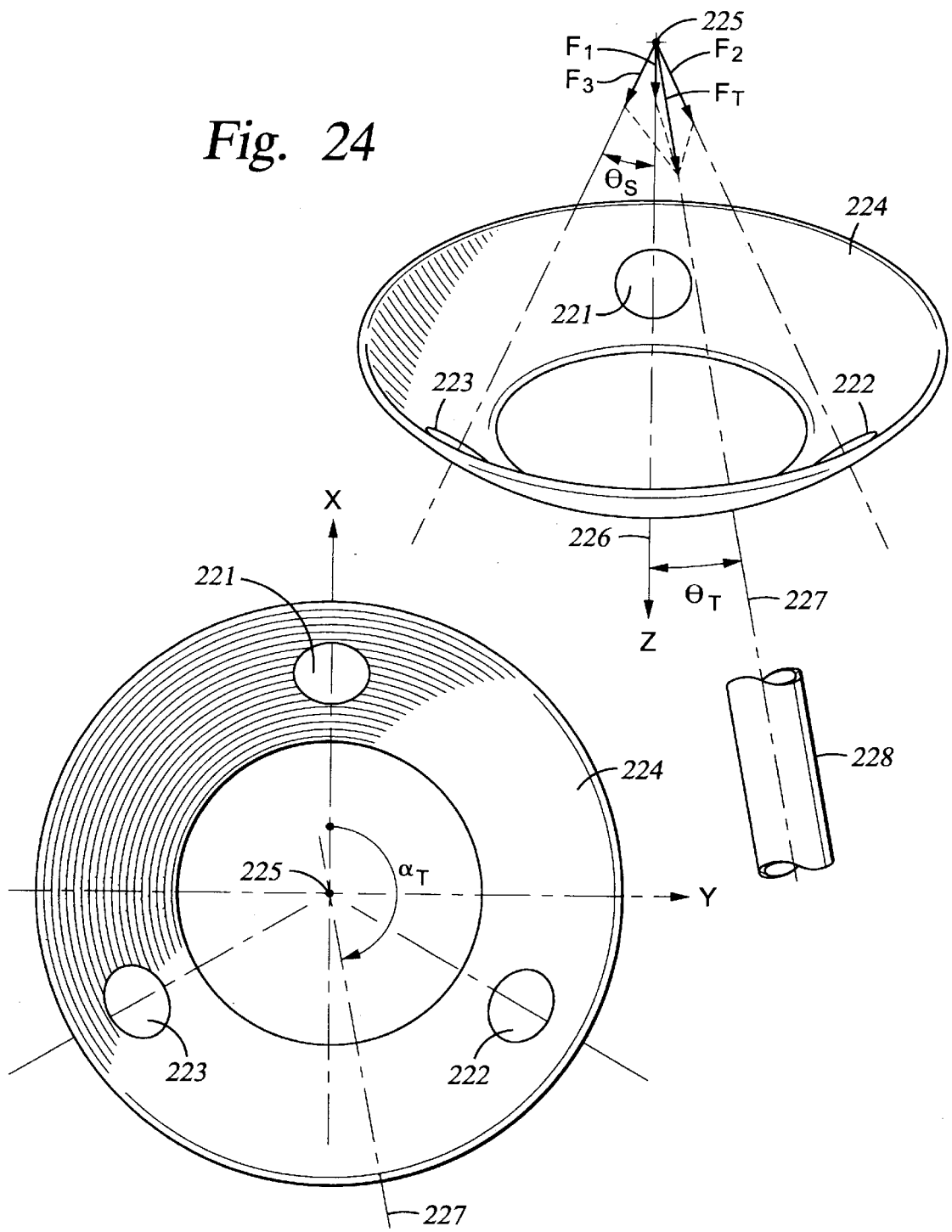
FIG. 24 is a diagram showing various force vectors directed from a focal point of an elastomeric flex bearing to force transducers on a load bearing surface of the outer metal support ring of the elastomeric bearing and to an elongated tension member.
FIG. 25 is a plan view of the arrangement introduced in FIG. 24.

The general purpose digital computer 136 in FIG. 11 or 172 in FIG. 12 is programmed to compute the force on the tension member and the direction of the tension member from the signals from the force transducer components integrated into the elastomeric flex bearing supporting the tension member. As shown in FIGS. 24 and 25, the forces $\vec{F}_1$, $\vec{F}_2$, $\vec{F}_3$ directed to the force transducer components 221, 222, 223 mounted on an outer load ring surface 224 can be expressed as vectors in spherical coordinates in which the z axis is in a downward direction from the bearing focus 225 along the longitudinal axis 226 of the bearing to define an elevation angle $\theta$ and an azimuthal angle $\alpha$ such that:

$$\vec{F}_i = F_i \sin \theta_i \cos \alpha_i \hat{x} + F_i \sin \theta_i \sin \alpha_i \hat{y} + F_i \cos \theta_i \hat{z}$$

Assuming that the elastomeric flex bearing is a perfect spherical bearing, then the transducer components 221, 222, 223 would sense respective force vectors $\vec{F}_1$, $\vec{F}_2$, $\vec{F}_3$ which would be directed from the bearing focus point to the respective force transducer components and which would add vectorially to produce the force $\vec{F}_T$ along the axis 227 of the tension member 228. In mathematical terms:

$$\begin{aligned}\vec{F}_T = \vec{F}_1 + \vec{F}_2 + \vec{F}_3 = \\ (F_1 \cos\alpha_1 + F_2 \cos\alpha_2 + F_3 \cos\alpha_3)\sin\theta_S \hat{x} + \\ (F_1 \sin\alpha_1 + F_2 \sin\alpha_2 + F_3 \sin\alpha_3)\sin\theta_S \hat{y} + \\ (F_1 + F_2 + F_3)\cos\theta_S \hat{z}\end{aligned}$$

For the case of three force transducer components located at $\alpha_1=0°$, $\alpha_2=120°$, $\alpha_3=240°$, $\theta_1=\theta_2=\theta_3=\theta_S$:

sin $\alpha_1=0$, cos $\alpha_1=1$, sin $\alpha_2=0.866$, cos $\alpha_2=-\frac{1}{2}$, sin $\alpha_3=-0.866$, cos $\alpha_3=-\frac{1}{2}$, $$\vec{F}_T = (F_1 - 1/2F_2 - 1/2F_3)\sin\theta_S \hat{x} +$$
$$(F_2 - F_3)(0.866)\sin\theta_S \hat{y} +$$
$$(F_1 + F_2 + F_3)\cos\theta_S \hat{z}$$

$$\alpha_T = \arctan(F_{Ty}/F_{Tx}) = \arctan\left(\frac{(F_2 - F_3)0.866}{(F_1 - F_2) + 1/2(F_2 - F_3)}\right)$$

$$\theta_T = \arctan(F_{Tr}/F_{Tz}) = \arctan\left(\sqrt{F_{Tx}^2 + F_{Ty}^2}\Big/F_{Tz}\right)$$

$$= \arctan\left(\tan\theta_S\left(\frac{\sqrt{(F_1 - F_2)(F_1 - F_3) + (F_2 - F_1)(F_2 - F_3) + (F_3 - F_1)(F_3 - F_2)}}{(F_1 + F_2 + F_3)}\right)\right)$$

$$\left|\vec{F}_T\right| \equiv F_T = \sqrt{F_{Tx}^2 + F_{Ty}^2 + F_{Ty}^2}$$

$$= SQRT([(F_1 - F_2)(F_1 - F_3) + (F_2 - F_1)(F_2 - F_3) +$$
$$(F_3 - F_1)(F_3 - F_2)]\sin\theta_S^2 + (F_1 + F_2 + F_3)^2\cos\theta_S^2)$$

$$= (F_1 + F_2 + F_3)\cos\theta_S/\cos\theta_T \approx (F_1 + F_2 + F_3)\cos\theta_S$$

To test the applicability of the vector model, the Abaqus (Trademark) software engineering tool was used to perform a quasi-dimensional finite element computer analysis of an elastomeric bearing. The elastomeric bearing was a type URSA bearing manufactured by Oil States Industries, Inc., 7701 S. Cooper St., Arlington, Tex. 76001, and having an outer diameter of 60", an inner diameter of 32", a height of 20", 14 natural rubber layers, and 13 steel laminations each 0.4" thick. According to the vector model, the axial load $F_T$ is related to the average pressure $P_{avg}$ indicated by the three force transducer components according to:

$F_T = 651.89\ P_{avg}$

Figure 26:
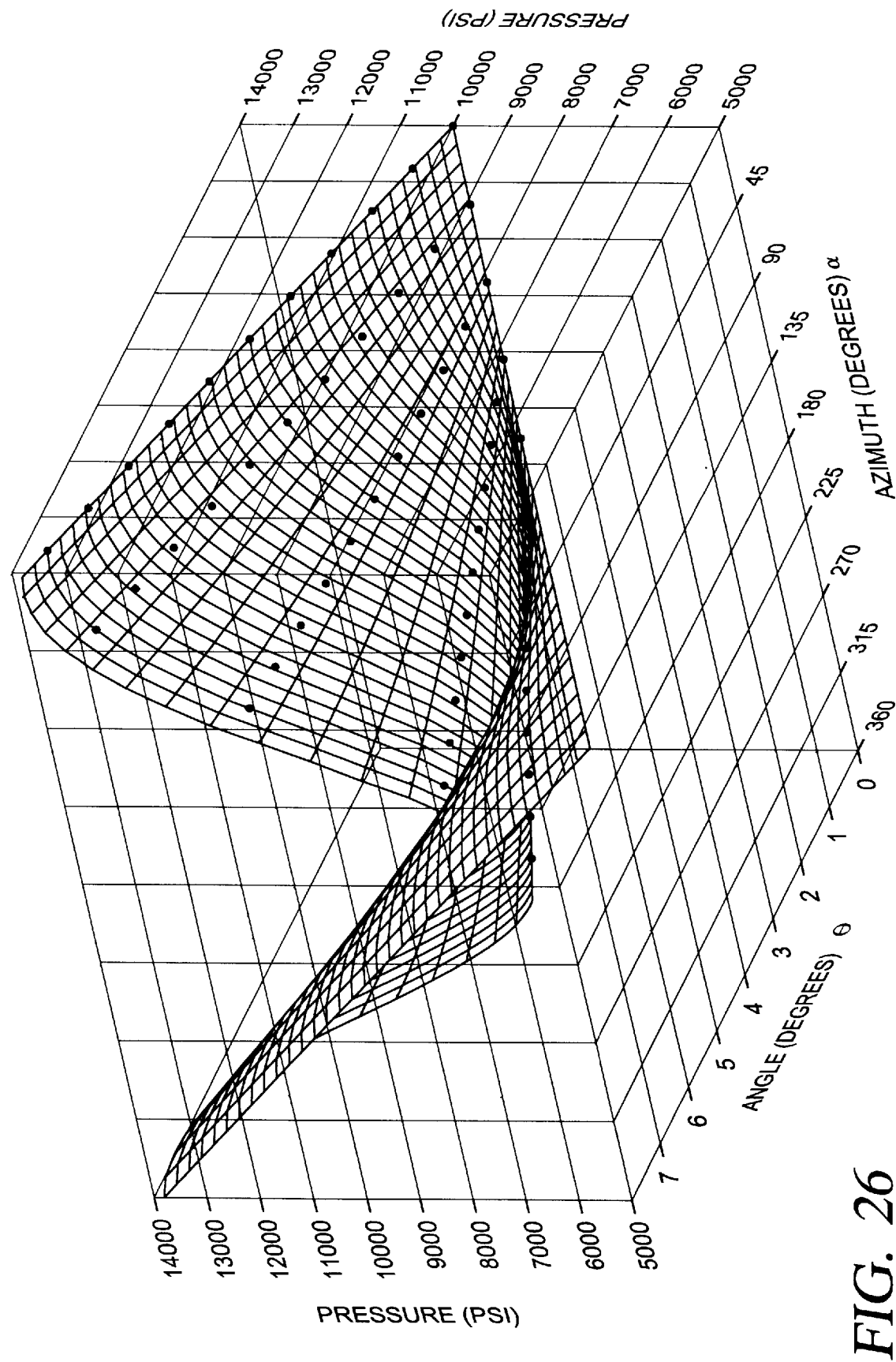
FIG. 26 is a graph of pressure versus the azimuth and elevation angle with respect to an elongated tension member as computed by a quasi-dimensional finite-element simulation for a laminated elastomeric flex bearing.

The azimuth $\alpha_T$ of the tension member was computed by the vector model as:

If $P_1 \geq P_{avg}$ then
 $\alpha_1 = \arctan[(1.1547(P_3 - P_{avg})/(P_1 - P_{avg})) + 0.5774]$ else
 $\alpha_1 = \arctan[(1.1547(P_3 - P_{avg})/(P_1 - P_{avg})) + 0.5774] + 180°$ The elevation or "cocking" angle $\theta_T$ was computed as:
 $\theta_T = 18.87(P_1 - P_{avg})/(P_{avg}\cos\alpha_T)$ The quasi-dimensional finite element analysis of the Abaqus software engineering tool computed the pressure sensed by any one of the force transducers components (located at a 24.5521" radius from the longitudinal axis) as a function of the azimuth $\alpha_T$ and elevation $\theta_T$ of the tendon. The results are plotted in the three-dimensional graph of FIG. 26. These results were fitted to an equation of the form $P = a\theta_T\cos(\alpha_T) + b\theta_T^2\cos[2(135\alpha_T)] + c\sqrt{\theta}_T\sin\alpha_{T+d\theta T}^2\cos[2\alpha_T] + e\theta_T^2\sin[\alpha_T/2] + f$. The coefficients from a "least squares" fit were:

a = 529.5329488 (Std error 1.298287492)

b = −2.70958718 (Std error 0.18497107)

c = 1.552425453 (Std error 6.087579525)

d = −6.5540102 (Std error 0.222671882)

e = 3.240577074 (Std error 0.322195883)

f = 9971.299466 (Std error 4.917485502)

The following table compares values computed from the vector model with values computed from the finite element analysis model, with the differences being indicated as errors:

| | | Input Values | | | | | | | Values Calculated from Pressure Measurements | | | | |
|---|---|---|---|---|---|---|---|---|---|---|---|---|---|
| | | Azimuth of Cocking (degrees) | | | Sensor Pressures (psi) | | | | Axial Load | | Azimuth (sensor 1, degrees) | | Cocking Angle (degrees) |
| Axial Load | Cocking Angle | from sensor 1 | from sensor 2 | from sensor 3 | Sensor 1 | Sensor 2 | Sensor 3 | Mean Avg. | L | Error | | | |
| lbf. | degrees | | | | p1 | p2 | p3 | $P_{avg.}$ | lbf. | lbf. | % | $\alpha_T$ Value | $\alpha_T$ error | $\theta_T$ Value | $\theta_T$ error |
| 2,000,000 | 1 | 0 | 120 | 240 | 3,229 | 2,987 | 2,988 | 3,068 | 2,000,064 | 64 | 0.00% | 0 | 0 | 0.99 | 0.01 |
| 2,000,000 | 2 | 40 | 160 | 280 | 3,320 | 2,754 | 3,131 | 3,068 | 2,000,104 | 104 | −0.01% | 41 | −1 | 2.05 | −0.05 |
| 2,000,000 | 4 | 80 | 200 | 320 | 3,218 | 2,440 | 3,549 | 3,069 | 2,000,422 | 422 | −0.02% | 77 | 3 | 4.04 | −0.04 |
| 2,000,000 | 6 | 120 | 240 | 0 | 2,192 | 2,642 | 3,975 | 3,070 | 2,001,283 | 1,283 | −0.06% | 122 | −2 | 5.57 | 0.43 |
| 2,000,000 | 7.5 | 180 | 300 | 60 | 1,736 | 3,698 | 3,781 | 3,072 | 2,002,450 | 2,450 | −0.12% | 178 | 2 | 8.21 | −0.71 |
| 4,000,000 | 0.1 | 220 | 340 | 100 | 6,111 | 6,167 | 6,131 | 6,136 | 4,000,117 | 117 | 0.00% | 219 | 1 | 0.10 | 0.00 |
| 4,000,000 | 2 | 260 | 20 | 140 | 6,039 | 6,741 | 5,629 | 6,136 | 4,000,208 | 208 | −0.01% | 261 | −1 | 2.00 | 0.00 |
| 4,000,000 | 4 | 300 | 60 | 180 | 6,797 | 6,846 | 4,769 | 6,137 | 4,000,843 | 843 | −0.02% | 299 | 1 | 4.21 | −0.21 |
| 4,000,000 | 6 | 340 | 100 | 220 | 7,827 | 5,919 | 4,675 | 6,140 | 4,002,566 | 2,566 | −0.06% | 337 | 3 | 5.64 | 0.36 |
| 4,000,000 | 7.5 | 0 | 120 | 240 | 8,361 | 4,956 | 5,114 | 6,144 | 4,004,900 | 4,900 | −0.12% | 2 | −2 | 6.82 | 0.68 |
| 6,000,000 | 0.1 | 40 | 160 | 280 | 9,242 | 9,158 | 9,212 | 9,204 | 6,000,176 | 176 | −0.00% | 40 | 0 | 0.10 | 0.00 |
| 6,000,000 | 2 | 80 | 200 | 320 | 9,402 | 8,273 | 9,938 | 9,204 | 6,000,312 | 312 | −0.01% | 78 | 2 | 2.01 | −0.01 |
| 6,000,000 | 4 | 120 | 240 | 0 | 8,245 | 8,309 | 11,064 | 9,206 | 6,001,265 | 1,265 | −0.02% | 121 | −1 | 3.81 | 0.19 |
| 6,000,000 | 6 | 160 | 280 | 40 | 6,230 | 9,890 | 11,510 | 9,210 | 6,003,850 | 3,850 | −0.06% | 163 | −3 | 6.40 | −0.40 |
| 6,000,000 | 7.5 | 200 | 320 | 80 | 5,599 | 11,823 | 10,224 | 9,215 | 6,007,350 | 7,350 | −0.12% | 194 | 6 | 7.65 | −0.15 |

-continued

| Input Values | | | | | Sensor Pressures (psi) | | | | Values Calculated from Pressure Measurements | | | | | | |
|---|---|---|---|---|---|---|---|---|---|---|---|---|---|---|---|
| | | Azimuth of Cocking | | | | | | | Axial | | | Azimuth (sensor 1, degrees) | | Cocking Angle (degrees) | |
| Axial | Cocking | (degrees) | | | Sensor | Sensor | Sensor | Mean | Load | | | | | | |
| Load | Angle | from | from | | 1 | 2 | 3 | Avg. | L | Error | | $\alpha_T$ | | $\theta_T$ | |
| lbf. | degrees | sensor 1 | sensor 2 | sensor 3 | p1 | p2 | p3 | $P_{avg.}$ | lbf. | lbf. | % | Value | error | Value | error |
| 6,500,000 | 0.1 | 240 | 0 | 120 | 9,944 | 10,024 | 9,945 | 9,971 | 6,500,190 | 190 | 0.00% | 239 | 1 | 0.10 | 0.00 |
| 6,500,000 | 2 | 280 | 40 | 160 | 10,174 | 10,790 | 8,950 | 9,972 | 6,500,338 | 338 | −0.01% | 281 | −1 | 2.05 | −0.05 |
| 6,500,000 | 4 | 340 | 100 | 220 | 11,854 | 9,692 | 8,373 | 9,973 | 6,501,370 | 1,370 | −0.02% | 338 | 2 | 3.84 | 0.16 |
| 6,500,000 | 6 | 0 | 120 | 240 | 12,919 | 8,426 | 8,588 | 9,977 | 6,504,171 | 4,171 | −0.06% | 2 | −2 | 5.57 | 0.43 |
| 6,500,000 | 7.5 | 20 | 140 | 260 | 13,532 | 6,729 | 9,688 | 9,983 | 6,507,962 | 7,962 | −0.12% | 26 | −6 | 7.45 | 0.05 |

The table shows that the vector model is a good approximation for calculating the direction of the tension member from the force transducer signals. Alternatively, the curve-fitted equation from the finite element analysis could be used for more accurately calculating the direction of the tension member from the force transducer signals. For example, pressure errors could be computed as was done in the above table, and the measured pressures could be adjusted by the errors to compute modified pressure values (deviating twice as much as the measured pressures from the pressures computed by curve-fitted equation from the finite element analysis), and then the vector model could be used to re-compute the tension member force magnitude, azimuth, and elevation from the modified pressure values.

For further accuracy, these re-computed values could be used as a trial solution for a Newton-Raphson procedure for simultaneously solving the three equations for respective pressures $P_1$, $P_2$, and $P_3$ given by the curve-fitted equation for the three respective azimuthal positions $\alpha_1$, $\alpha_2$, and $\alpha_3$ of the pressure sensors. The Newton-Raphson solution procedure is described, for example, on pages 43–44 of the CRC Handbook of Mathematical Tables, 1980, Chemical Rubber Company Press Inc., Boca Raton, Fla. Let the system of the three equations be designated as $E_i(X)=0$, where X is the vector $(F_T, \alpha_T, \theta_T)$ of unknowns. The Newton-Raphson solution procedure is an iterative method that starts with a trial solution $X^{[0]}$, and obtains successive approximations $X^{[j+1]}$ by solving the simultaneous linear equations $$E_i(X^{[j]}) + \sum_{k=1}^{n} \left[\frac{\partial E_i}{\partial X_k}\right]_{X_k^{[j]}} (X_k^{[j+1]} - X_k^{[j]}) = 0$$

for $i = 1$ to $n$

The simultaneous linear equations can be written as a single matrix equation $$E(X^{[j]}) + [J](X_k^{[j+1]} - X_k^{[j]}) = 0$$

where [J] is the so-called Jacobian matrix having the elements that are the partial derivatives $$\frac{\partial E_i}{\partial X_k}$$

evaluated at $X_k = X_k^{[j]}$. The matrix equation can be solved by inverting the Jacobian matrix, to obtain the iterative equation:

$$X_k^{[j+1]} = X_k^{[j]} - [J]^{-1} E(X^{[j]})$$

Finally, if for some reason a quasi-dimensional finite element analysis of a particular design for an elastomeric bearing would itself be an inaccurate characterization of the bearing, it would be possible to manufacture the bearing with the integrally-fabricated force transducer components, place the bearing and a tension member in a test fixture for applying various loads and deflections to the tension member, and to measure the signals from the force transducers in order to obtain experimental data that would characterize the elastomeric bearing. A characterization equation similar to the one given above for the finite element analysis could be fitted to the experimental data and used in a similar manner for computing the tension member force and the azimuth and elevation angles of the tension member from the transducer signals when the elastomeric bearing is used in an offshore platform.

In view of the above, there has been described a load and deflection measurement system in which force transducers are integrated in an elastomeric flex bearing to provide signals for determining the tension and torque upon a tension member coupled to the bearing and for computation of the azimuth and elevation of the tension member. Preferably the force transducers are mounted to or embedded in an outer metal load ring of the flex bearing and are bonded with the outer metal load ring to the elastomer of the flex bearing. The force transducer, for example, includes a diaphragm bonded to the elastomer, and the diaphragm has a diameter in excess of the spacing between the outer metal load ring and the nearest laminated metal reinforcement of the bearing. In one embodiment, metal foil strain gages are bonded to the surface of the diaphragm opposite from the elastomer. In another embodiment, the diaphragm transmits pressure to hydraulic fluid between the diaphragm and the outer metal support ring. A proximity sensor sensing the position of the diaphragm with respect to the outer metal support ring can detect any loss of hydraulic fluid and can be used to calibrate the hydraulic transducer under an unknown load by injecting hydraulic fluid under pressure until the diaphragm assumes a position for which the fluid pressure is indicative of the pressure applied by the elastomer to the diaphragm.

What is claimed is:

1. An elastomeric bearing comprising, in combination;
   a metal load member;
   a metal support ring;
   elastomer disposed between the metal load member and the metal support ring for coupling force between the metal load member and the metal support ring; and
   force transducer components mounted to the metal support ring between the metal support ring and the metal load member for sensing the force between the metal load member and the metal support ring, wherein the force transducer components and the metal support ring are bonded to the elastomer.

2. The elastomeric bearing as claimed in claim 1, wherein the metal support ring has a semi-spherical surface bonded to the elastomer for receiving a substantial force applied by the metal load ring to the metal support ring, the substantial force being directed generally along an axis of the metal support ring.

3. The elastomeric bearing as claimed in claim 1, wherein the force transducer components are spaced in a direction around an axis of the metal support ring.

4. The elastomeric bearing as claimed in claim 3, wherein the force transducer components produce signals for signaling a deflection angle of the metal load member with respect to the axis of the metal support ring.

5. The elastomeric bearing as claimed in claim 4, which includes at least three force transducer components disposed at at least three respective angular positions around the axis of the metal support ring for producing signals for signaling an azimuthal angle and an elevation angle of the metal load member with respect to the axis of the metal support ring.

6. The elastomeric bearing as claimed in claim 5, further including a digital computer coupled to the force transducer components for receiving the signals and programmed for computing the azimuthal angle and the elevation angle of deflection of the metal load member with respect to the axis of the metal support ring.

7. The elastomeric bearing as claimed in claim 1, wherein the force transducer components sense pressure applied by the elastomer and shear force transmitted by the elastomer.

8. The elastomeric bearing as claimed in claim 1, wherein the force transducer components include a diaphragm bonded to the elastomer and strain gages bonded to the diaphragm opposite from the elastomer for sensing pressure and shear force transmitted from the elastomer to the diaphragm.

9. The elastomeric bearing as claimed in claim 1, wherein the force transducer components include a diaphragm and a proximity sensor for sensing position of the diaphragm with respect to the metal support ring.

10. An elastomeric bearing comprising, in combination;
a metal load member;
a metal support ring;
elastomer disposed between the metal load member and the metal support ring for coupling force between the metal load member and the metal support ring; and
force transducer components mounted to the metal support ring between the metal support ring and the metal load member for sensing the force between the metal load member and the metal support ring, wherein the force transducer components and the metal support ring are bonded to the elastomer, and wherein the force transducer components include a diaphragm, substantially incompressible fluid between the diaphragm and the metal support ring, and a fluid pressure sensor for sensing pressure of the substantially incompressible fluid between the diaphragm and the metal support ring.

11. The elastomeric bearing as claimed in claim 10, wherein the fluid pressure sensor is remote from the diaphragm, and further including a hydraulic line for transmitting the fluid pressure from the diaphragm to the metal support ring.

12. The elastomeric bearing as claimed in claim 10, further including a pump for injecting the substantially incompressible fluid between the diaphragm and the metal support ring when a substantial load is placed on the metal support ring by the load member.

13. The elastomeric bearing as claimed in claim 10, further including a proximity sensor sensing position of the diaphragm responsive to volume of the incompressible fluid between the diaphragm and the metal support ring.

14. The elastomeric bearing as claimed in claim 1, wherein the transducer components are embedded in recesses formed in the metal support ring.

15. The elastomeric bearing as claimed in claim 1, wherein the force signals are conveyed from the transducer components to a location remote from the transducer components via signal transmission elements embedded in slots formed in the metal support ring at a surface of the metal support ring adjacent to the elastomer.

16. The elastomeric bearing as claimed in claim 1, which includes a plurality of metal reinforcement laminations and elastomer layers between the metal load member and the metal support ring, and wherein the transducer components include a diaphragm mounted to the metal support ring, wherein a metal reinforcement lamination closest to the diaphragm is spaced from the diaphragm by a distance, and the diaphragm has lateral dimensions each greater than said distance.

17. An elastomeric bearing comprising, in combination;
an inner metal support ring;
an outer metal support ring;
a plurality of metal reinforcement laminations and elastomer layers between the inner metal support ring and the outer metal support ring; and
force transducer components mounted to the outer metal support ring at a surface of the outer metal support ring facing the metal reinforcement laminations and at spaced positions around an axis of the outer metal support ring;
wherein the inner metal support ring, the outer metal support ring, the plurality of metal reinforcement laminations, and the force transducer components are bonded to the elastomer of the elastomer layers.

18. The elastomeric bearing as claimed in claim 17, wherein the metal reinforcement laminations and the surface of the outer metal support ring facing the metal reinforcement laminations are generally semi-spherical with respect to a common focus point.

19. The elastomeric bearing as claimed in claim 17, wherein the force transducer components sense axial load of the inner metal support ring with respect to the outer metal support ring, and torque of the inner metal support ring with respect to the outer metal support ring.

20. The elastomeric bearing as claimed in claim 17, wherein the force transducer components produce signals for signaling a deflection angle of the inner metal load ring with respect to the axis of the metal support ring.

21. The elastomeric bearing as claimed in claim 17, which includes at least three force transducer components disposed at at least three respective angular positions around the axis of the outer metal support ring for producing signals for signaling an azimuthal angle and an elevation angle of the inner metal support ring with respect to the axis of the outer metal support ring.

22. The elastomeric bearing as claimed in claim 21, further including a digital computer coupled to the force transducer components for receiving the signals and programmed for computing the azimuthal angle and the elevation angle of the inner metal support ring with respect to the axis of the outer metal support ring.

23. The elastomeric bearing as claimed in claim 17, wherein the force transducer components include, at each of a plurality of the spaced locations, a diaphragm mounted to the outer metal support ring, wherein a metal reinforcement lamination closest to the diaphragm is spaced from the diaphragm by a distance, and wherein the diaphragm has lateral dimensions each greater than said distance.

24. The elastomeric bearing as claimed in claim 23, wherein the diaphragm at each spaced location is bonded to a metal support disk, and the metal support disk is embedded in a recess in the outer metal support ring.

25. The elastomeric bearing as claimed in claim 17, wherein the force transducer components include, at each of a plurality of the spaced locations, a diaphragm mounted to the outer metal support ring and bonded to the elastomer, and strain gages bonded to the diaphragm opposite from the elastomer for sensing pressure and shear force transmitted from the elastomer to the diaphragm.

26. The elastomeric bearing as claimed in claim 17, wherein the force transducer components include, at each of a plurality of the spaced locations, a diaphragm and a proximity sensor for sensing position of the diaphragm with respect to the metal support ring.

27. An elastomeric bearing comprising, in combination;
an inner metal support ring;
an outer metal support ring;
a plurality of metal reinforcement laminations and elastomer layers between the inner metal support ring and the outer metal support ring; and
force transducer components mounted to the outer metal support ring at a surface of the outer metal support ring facing the metal reinforcement laminations and at spaced positions around an axis of the outer metal support ring;
wherein the inner metal support ring, the outer metal support ring, the plurality of metal reinforcement laminations, and the force transducer components are bonded to the elastomer of the elastomer layers; and
wherein the force transducer components include, at each of a plurality of the spaced locations, a diaphragm mounted to the outer metal support ring, substantially incompressible fluid between the diaphragm and the outer metal support ring, and a fluid pressure sensor for sensing pressure of the substantially incompressible fluid between the diaphragm and the outer metal support ring.

28. The elastomeric bearing as claimed in claim 27, wherein the fluid pressure sensor is remote from the diaphragm, and further including a hydraulic line for transmitting the fluid pressure from the diaphragm to the outer metal support ring.

29. The elastomeric bearing as claimed in claim 27, further including a pump for injecting the substantially incompressible fluid between the diaphragm and the outer metal support ring when a substantial load is placed on the outer metal support ring by the inner metal support ring.

30. The elastomeric bearing as claimed in claim 27, further including a proximity sensor sensing position of the diaphragm responsive to volume of the incompressible fluid between the diaphragm and the outer metal support ring.

31. The elastomeric bearing as claimed in claim 17, wherein the transducer components are embedded in recesses formed in the outer metal support ring.

32. The elastomeric bearing as claimed in claim 17, wherein the force signals are conveyed from the transducer components to a location remote from the transducer components via signal transmission elements embedded in slots formed in the outer metal support ring at a surface of the outer metal support ring adjacent to the elastomer.

33. An elastomeric bearing comprising, in combination;
a first load member;
a second load member;
elastomer disposed between the first and second load members for coupling force between the first and second load members;
a diaphragm mounted to the second load member between the elastomer and the second load member;
substantially incompressible fluid between the diaphragm and the second load member;
a fluid pressure sensor for sensing pressure of the substantially incompressible fluid between the diaphragm and the second load member; and
a sensor responsive to volume of the substantially incompressible fluid between the diaphragm and the second load member.

34. The elastomeric bearing as claimed in claim 33, wherein the sensor responsive to volume of the substantially incompressible fluid between the diaphragm and the second load member i s a proximity sensor for sensing position of the diaphragm with respect to the second load member.

35. The elastomeric bearing as claimed in claim 33, further including a pump for injecting the substantially incompressible fluid between the diaphragm and the second load member when a substantial load is applied between the first and second load members.

36. An elastomeric bearing for supporting a tendon depending from a floating platform to a subsea anchor, said elastomeric bearing comprising, in combination;
a metal load member adapted for coupling to the tendon for supporting the tendon;
a metal support ring adapted for coupling the elastomeric bearing to the floating platform for supporting the elastomeric bearing;
elastomer disposed between the metal load member and the metal support ring for coupling force between the metal load member and the metal support ring; and
force transducer components mounted to the metal support ring between the metal support ring and the metal load member for sensing the force between the metal load member and the metal support ring, wherein the force transducer components and the metal support ring are bonded to the elastomer.

37. The elastomeric bearing as claimed in claim 36, wherein the force transducer components produce signals for signaling a deflection angle of the inner metal load ring with respect to the axis of the metal support ring, and further including a digital computer coupled to the force transducer components for receiving the signals and programmed for computing the azimuthal angle and the elevation angle of deflection of the metal load member with respect to the axis of the metal support ring.

38. The elastomeric bearing as claimed in claim 36, wherein the force transducer components include a diaphragm and a proximity sensor for sensing position of the diaphragm with respect to the metal support ring.

39. The elastomeric bearing as claimed in claim 36, wherein the transducer components are embedded in recesses formed in the metal support ring.

40. The elastomeric bearing as claimed in claim 36, wherein the force signals are conveyed from the transducer components to a location remote from the transducer components via signal transmission elements embedded in slots formed in the metal support ring at a surface of the metal support ring adjacent to the elastomer.

41. The elastomeric bearing as claimed in claim 36, which includes a plurality of metal reinforcement laminations and elastomer layers between the metal load member and the metal support ring, and wherein the transducer components include a diaphragm mounted to the metal support ring, wherein a metal reinforcement lamination closest to the diaphragm is spaced from the diaphragm by a distance, and the diaphragm has lateral dimensions each greater than said distance.

42. An elastomeric bearing for supporting a tendon depending from a floating platform to a subsea anchor, said elastomeric bearing comprising, in combination:

an inner metal support ring adapted for coupling to the tendon for supporting the tendon;

an outer metal support ring adapted for coupling to the floating platform for supporting the elastomeric bearing;

a plurality of metal reinforcement laminations and elastomer layers between the inner metal support ring and the outer metal support ring; and force transducer components mounted to the outer metal support ring at a surface of the outer metal support ring facing the metal reinforcement laminations and at spaced positions around an axis of the outer metal support ring;

wherein the inner metal support ring, the outer metal support ring, the plurality of metal reinforcement laminations, and the force transducer components are bonded to the elastomer of the elastomer layers.

43. The elastomeric bearing as claimed in claim 42, wherein the force transducer components produce signals for signaling a deflection angle of the inner metal load ring with respect to the axis of the metal support ring, and further including a digital computer coupled to the force transducer components for receiving the signals and programmed for computing the azimuthal angle and the elevation angle of the inner metal support ring with respect to the axis of the outer metal support ring.

44. The elastomeric bearing as claimed in claim 42, wherein the force transducer components include, at each of a plurality of the spaced locations, a diaphragm mounted to the outer metal support ring, wherein a metal reinforcement lamination closest to the diaphragm is spaced from the diaphragm by a distance, and wherein the diaphragm has lateral dimensions each greater than said distance.

45. The elastomeric bearing as claimed in claim 42, wherein the force transducer components include, at each of a plurality of the spaced locations, a diaphragm and a proximity sensor for sensing position of the diaphragm with respect to the metal support ring.

46. The elastomeric bearing as claimed in claim 42, wherein the transducer components are embedded in recesses formed in the outer metal support ring.

47. The elastomeric bearing as claimed in claim 42, wherein the force signals are conveyed from the transducer components to a location remote from the transducer components via signal transmission elements embedded in slots formed in the outer metal support ring at a surface of the outer metal support ring adjacent to the elastomer.

* * * * *